(12) United States Patent
Ding et al.

(10) Patent No.: US 11,557,781 B2
(45) Date of Patent: Jan. 17, 2023

(54) ELECTROCHEMICAL CELLS FOR HYDROGEN GAS PRODUCTION AND ELECTRICITY GENERATION, AND RELATED SYSTEMS AND METHODS

(71) Applicant: Battelle Energy Alliance, LLC, Idaho Falls, ID (US)

(72) Inventors: Dong Ding, Idaho Falls, ID (US); Hanping Ding, Idaho Falls, ID (US); Wei Wu, Idaho Falls, ID (US); Chao Jiang, Ammon, ID (US); Ting He, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 232 days.

(21) Appl. No.: 16/560,719

(22) Filed: Sep. 4, 2019

(65) Prior Publication Data
US 2020/0075980 A1 Mar. 5, 2020

Related U.S. Application Data

(60) Provisional application No. 62/727,151, filed on Sep. 5, 2018.

(51) Int. Cl.
*H01M 8/0656* (2016.01)
*H01M 8/1253* (2016.01)
(Continued)

(52) U.S. Cl.
CPC ....... *H01M 8/0656* (2013.01); *H01M 4/8652* (2013.01); *H01M 4/9033* (2013.01);
(Continued)

(58) Field of Classification Search
CPC ............ H01M 8/0656; H01M 8/1253; H01M 4/9066; H01M 4/9033; H01M 4/8652; H01M 2008/1293
See application file for complete search history.

(56) References Cited

U.S. PATENT DOCUMENTS 5,948,221 A * 9/1999 Hsu .................. H01M 8/243
204/270
8,247,113 B2 8/2012 Gauthier et al.
(Continued)

FOREIGN PATENT DOCUMENTS

KR 1615692 B1 * 4/2016 ............ Y02E 60/128
WO 2018/080571 A1 5/2018

OTHER PUBLICATIONS

Sadykov ("Structural Studies of Pr Nickelate-Cobaltite-Y-Doped Ceria Nanocomposite"; J. Ceram. Sci. Tech.; 08 [01] 129-140). (Year: 2017).*

*Primary Examiner* — Jeremiah R Smith
(74) *Attorney, Agent, or Firm* — TraskBritt

(57) ABSTRACT

An electrochemical cell comprises a first electrode, a second electrode, and a proton-conducting membrane between the first electrode and the second electrode. The first electrode comprises $Pr(Co_{1-x-y-z}, Ni_x, Mn_y, Fe_z)O_{3-\delta}$, wherein $0 \leq x \leq 0.9$, $0 \leq y \leq 0.9$, $0 \leq z \leq 0.9$, and $\delta$ is an oxygen deficit. The second electrode comprises a cermet material including at least one metal and at least one perovskite. Related structures, apparatuses, systems, and methods are also described.

15 Claims, 16 Drawing Sheets

(51) Int. Cl.
   *H01M 4/90*   (2006.01)
   *H01M 4/86*   (2006.01)
   *H01M 8/12*   (2016.01)

(52) U.S. Cl.
   CPC ....... *H01M 4/9066* (2013.01); *H01M 8/1253* (2013.01); *H01M 2008/1293* (2013.01)

(56) References Cited

U.S. PATENT DOCUMENTS

| | | |
|---|---|---|
| 8,354,011 B2 | 1/2013 | Elangovan et al. |
| 8,852,820 B2* | 10/2014 | Perry ................ H01M 8/04074 |
| | | 429/408 |
| 9,755,263 B2* | 9/2017 | Trevisan ........... H01M 8/04007 |
| 2004/0062968 A1 | 4/2004 | Tanner |
| 2004/0191598 A1* | 9/2004 | Gottmann ................. C25B 1/04 |
| | | 429/418 |
| 2007/0045125 A1 | 3/2007 | Hartvigsen et al. |
| 2010/0112408 A1* | 5/2010 | Yang ................... C04B 35/6262 |
| | | 429/489 |
| 2015/0218713 A1 | 8/2015 | Laucournet et al. |
| 2016/0301070 A1* | 10/2016 | Tong ................... H01M 4/9033 |
| 2019/0245224 A1* | 8/2019 | Lacroix ............. H01M 8/04216 |
| 2020/0358112 A1* | 11/2020 | Chatroux .......... H01M 8/04089 |

* cited by examiner

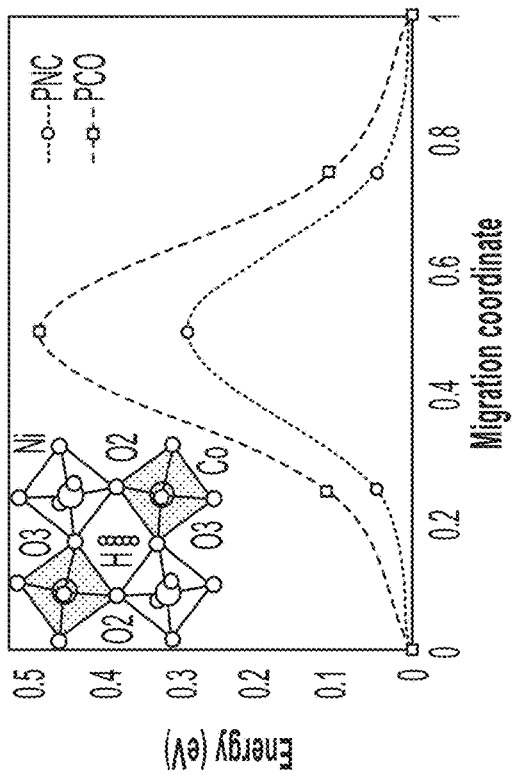
FIG. 19
FIG. 20
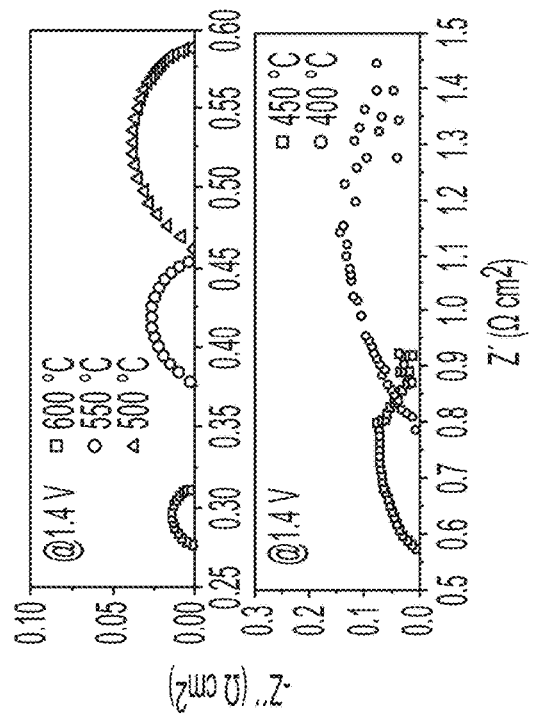
FIG. 21
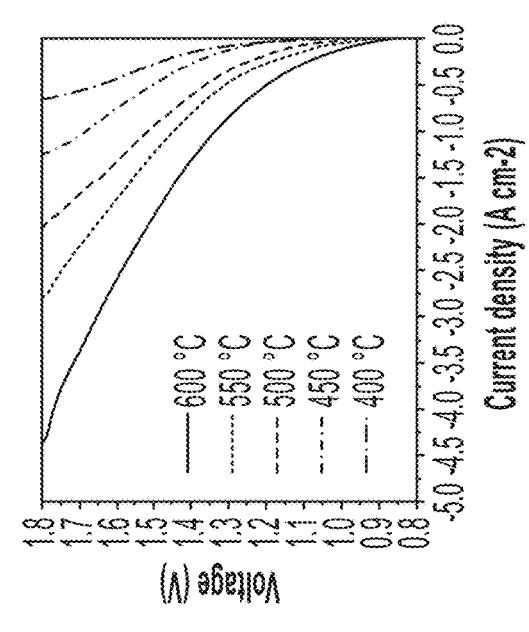
FIG. 22

ELECTROCHEMICAL CELLS FOR HYDROGEN GAS PRODUCTION AND ELECTRICITY GENERATION, AND RELATED SYSTEMS AND METHODS

CROSS-REFERENCE TO RELATED APPLICATION

This application claims the benefit under 35 U.S.C. § 119(e) of U.S. Provisional Patent Application Ser. No. 62/727,151, filed Sep. 5, 2018, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to electrochemical cells for hydrogen gas production and electricity generation, and to related structures, apparatuses, systems, and methods.

BACKGROUND

Hydrogen ($H_2$) gas is a clean and effective energy carrier to store renewable and sustainable energies, which can be efficiently converted to electricity through fuel cell technology. $H_2$ gas production is important to achieving a carbon-neutral energy route. High-temperature electrolysis is a conventional process for $H_2$ gas production that has several advantages, such as high efficiency, fast electrode kinetics, and relatively less expensive materials. Many electrochemical cells employed for high-temperature electrolysis can also be reversibly operated such that energy storage and electricity generation can be effectuated simultaneously.

High-temperature solid-oxide electrolysis cells (SOEC) are one type of electrochemical cell that has conventionally been employed to produce $H_2$ gas through $H_2O$ electrolysis. However, high-temperature solid-oxide electrolysis cells can suffer from material degradation and material incompatibilities at the relatively high operating temperatures (e.g., above 600° C., such as from 600° to 800° C.) typically required thereby.

To achieve $H_2$ gas production at relatively lower temperatures, protonic ceramic electrolysis cells (PCECs) have been investigated, since the electrolyte material thereof generally exhibits lower ionic diffusion activation energy over conventional oxygen-ion conductors (e.g., YSZ, GDC, etc.). For example, the operating temperature for many PCECs can be as low as 400° C. In addition, PCECs can produce dry $H_2$ gas, circumventing many problems otherwise associated with purifying humid $H_2$ gas and/or undesirable steam-based metal oxidation. However, challenges remain in the use of PCECs to produce $H_2$ gas since the steam-side electrodes thereof generally need to be exposed to highly humid air conditions. If the operating temperature of the PCEC is further decreased, the steam-side electrodes may exhibit significant over-potential as catalytic activity becomes poor. In addition, conventional steam-side PCEC electrodes can exhibit unfavorable chemical stability under high water vapor pressure conditions. For example, rare-earth elements (e.g., strontium (Sr), barium (Ba), etc.) present in many conventional perovskites employed in conventional steam-side PCEC electrodes are active to react with steam to form secondary insulating phases, which can rapidly deteriorate $H_2O$ electrolysis and $H_2$ gas production performance.

It would be desirable to have new structures, apparatuses, methods, and systems for producing $H_2$ gas and generating electricity. It would further be desirable if the new structures, apparatuses, methods, and systems facilitated increased $H_2$ gas production and electricity generation efficiency, increased operational life, and were relatively inexpensive and simple in operation.

BRIEF SUMMARY

Embodiments described herein include electrochemical cells for $H_2$ gas production and electricity generation, as well as related structures, apparatuses, systems, and methods. In some embodiments, an electrochemical cell comprises a first electrode, a second electrode, and a proton-conducting membrane between the first electrode and the second electrode. The first electrode comprises $Pr(Co_{1-x-y-z}, Ni_x, Mn_y, Fe_z)O_{3-\delta}$, wherein $0 \leq x \leq 0.9$, $0 \leq y \leq 0.9$, $0 \leq z \leq 0.9$, and $\delta$ is an oxygen deficit. The second electrode comprises a cermet material including at least one metal and at least one perovskite.

In additional embodiments, a system for $H_2$ gas production and electricity generation comprises source of steam, and an electrochemical apparatus in fluid communication with the source of steam. The electrochemical apparatus comprises a housing structure configured and positioned to receive a steam stream from the source of steam, and an electrochemical cell within an internal chamber of the housing structure. The electrochemical cell comprises an electrode positioned to interact with the steam stream, another electrode, and a proton-conducting membrane between the electrode and the another electrode. The electrode comprises $Pr(Co_{1-x-y-z}, Ni_x, Mn_y, Fe_z)O_{3-\delta}$, wherein $0 \leq x \leq 0.9$, $0 \leq y \leq 0.9$, $0 \leq z \leq 0.9$, and $\delta$ is an oxygen deficit. The another electrode comprises a metal/perovskite cermet. The proton-conducting membrane comprises a perovskite having an ionic conductivity greater than or equal to about $10^{-2}$ S/cm at one or more temperatures within a range of from about 400° C. to about 600° C.

In yet additional embodiments, a method of generating electricity comprises introducing steam to an electrochemical cell comprising a first electrode comprising $Pr(Co_{1-x-y-z}, Ni_x, Mn_y, Fe_z)O_{3-\delta}$, wherein $0 \leq x \leq 0.9$, $0 \leq y \leq 0.9$, $0 \leq z \leq 0.9$, and $\delta$ is an oxygen deficit; a second electrode comprising a metal/perovskite cermet; and a proton-conducting membrane between the first electrode and the second electrode. A first potential difference is applied between the first electrode and the second electrode of the electrochemical cell to produce $H_2$ gas from the steam. A second potential difference is applied between the first electrode and the second electrode of the electrochemical cell to generate electricity using the produced $H_2$ gas as a fuel.

In further embodiments, a structure comprises at least one perovskite having the general formula: $ABO_{3-\delta}$, wherein A consists of one or more lanthanide elements, B consists of Co and one or more of Ni, Mn, and Fe, and $\delta$ is an oxygen deficit.

In yet further embodiments, an apparatus comprises at least one structure comprising $Pr(Co_{1-x-y-z}, Ni_x, Mn_y, Fe_z)O_{3-\delta}$, wherein $0 \leq x \leq 0.9$, $0 \leq y \leq 0.9$, $0 \leq z \leq 0.9$, and $\delta$ is an oxygen deficit.

BRIEF DESCRIPTION OF THE DRAWINGS

FIGS. 19 and 20 are graphical representations of minimum energy path (MEP) calculation results along two representative proton transfer pathways in bulk $PrNi_{0.5}Co_{0.5}O_{3-\delta}$, as described in Example 8.

FIG. 21 is a graphical representation of current-voltage curves measured at different temperatures within the range of from 400° C. to 600° C. during operation of an electrochemical cell of the disclosure in electrolysis mode, as described in Example 9.

FIG. 22 shows the electrochemical impedance spectra of an electrochemical cell of the disclosure during electrolysis mode operation at different temperatures within the range of from 400° C. to 600° C., as described in Example 9.

DETAILED DESCRIPTION

Figure 1:
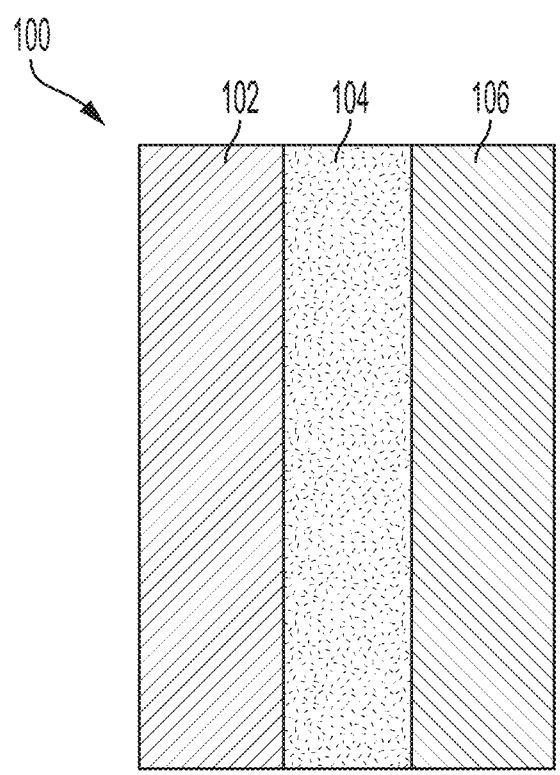
FIG. 1 is a simplified schematic view of an electrochemical cell for $H_2$ gas production and electricity generation, in accordance with an embodiment of the disclosure.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system.

As used herein, the term "negative electrode" means and includes an electrode having a relatively lower electrode potential in an electrochemical cell (i.e., lower than the electrode potential in a positive electrode therein). Conversely, as used herein, the term "positive electrode" means and includes an electrode having a relatively higher electrode potential in an electrochemical cell (i.e., higher than the electrode potential in a negative electrode therein).

As used herein the term "electrolyte" means and includes an ionic conductor, which can be in a solid state, a liquid state, or a gas state (e.g., plasma).

As used herein, the term "compatible" means that a material does not undesirably react, decompose, or absorb another material, and also that the material does not undesirably impair the chemical and/or mechanical properties of the another material.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

An embodiment of the disclosure will now be described with reference to FIG. 1, which schematically illustrates an electrochemical cell 100. As shown in FIG. 1, the electrochemical cell 100 includes a first electrode 102 (e.g., a steam side electrode), a second electrode 106 (e.g., an $H_2$ gas side electrode), and a proton-conducting membrane 104 between the first electrode 102 and the second electrode 106. As described in further detail below, the electrochemical cell 100 may be operated in an electrolysis mode to produce $H_2$ gas from steam (e.g., gaseous $H_2O$), and may also be operated (e.g., reversibly operated) in a fuel cell mode to generate electricity from $H_2$ gas (e.g., at least a portion of the $H_2$ gas produced when the electrochemical cell 100 is operated in the electrolysis mode).

The first electrode 102 (e.g., steam side electrode) may be formed of and include a triple conducting perovskite compatible with the material compositions of the proton-conducting membrane 104 and the second electrode 106 and the operating conditions (e.g., temperature, pressure, current density, etc.) of the electrochemical cell 100. As used herein the term "triple conducting perovskite" means and includes a perovskite formulated to conduct hydrogen ions ($H^+$)(i.e., protons), oxygen ions ($O^2$), and electrons ($e^-$). The triple conducting perovskite of the first electrode 102 may facilitate the production of $H_2$ gas from steam (e.g., through water splitting reaction (WSR)) when the electrochemical cell 100 is operated in electrolysis mode at a temperature within the range of from about 400° C. to about 600° C., and may also facilitate electricity generation from $H_2$ gas (e.g., the oxygen reduction reaction (ORR)) when the electrochemical cell 100 is operated in fuel cell mode at a temperature within the range of from about 400° C. to about 600° C. The triple conducting perovskite of the first electrode 102 exhibits a cubic lattice structure, with the general formula:

$$ABO_{3-\delta} \quad (1)$$

wherein one or more lanthanide elements (e.g., lanthanum (La), cerium (Ce), praseodymium (Pr), neodymium (Nd), promethium (Pm), samarium (Sm), europium (Er), gadolinium (Gd), terbium (Tb), dysprosium (Dy), holmium (Ho), erbium (Er), thulium (Tm), ytterbium (Yb), lutetium (Lu)) occupy "A" sites in the cubic lattice structure; cobalt (Co) and one or more of nickel (Ni), manganese (Mn), and iron (Fe) occupy "B" sites in the cubic lattice structure; and δ is the oxygen deficit. The triple conducting perovskite is free of ions of rare-earth elements (e.g., calcium (Ca), strontium (Sr), barium (Ba)) at "A" sites in the cubic lattice structure thereof, which may reduce the reactivity of the triple conducting perovskite (e.g., relative to conventional perovskites including rare-earth elements at "A" sites in the cubic lattice structure thereof) with steam and enhance the production of $H_2$ gas by the electrochemical cell 100 when operated in electrolysis mode.

Figure 2:
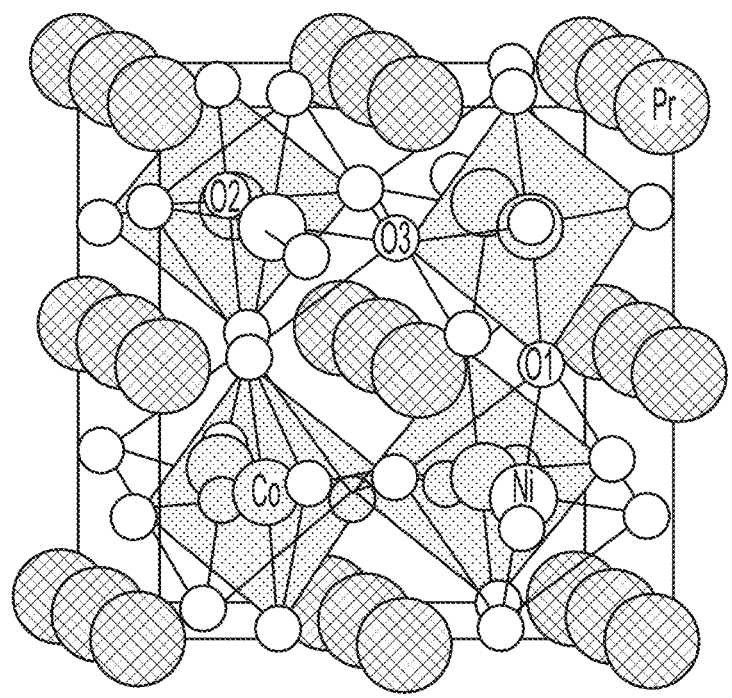
FIG. 2 is a simplified perspective view of the lattice structure of a triple conducting perovskite of an electrode of the electrochemical cell shown in FIG. 1.

By way of non-limiting example, the triple conducting perovskite of the first electrode 102 may comprise $Pr(Co_{1-x-y-z}Ni_xMn_yFe_z)O_{3-\delta}$, wherein 0≤x≤0.9, 0≤y≤0.9, 0≤z≤0.9, and δ is an oxygen deficit. In some embodiments, the triple conducting perovskite of the first electrode 102 comprises $PrNi_{0.5}Co_{0.5}O_{3-\delta}$ (hereinafter also referred to as "PNC"). FIG. 2 shows a simplified perspective view of the cubic lattice structure of $PrNi_{0.5}Co_{0.5}O_{3-\delta}$. PNC may be formed by replacing (e.g., substituting) some of the Co at "B" sites of $PrCoO_3$ perovskite with Ni. It was unexpectedly discovered that replacing a portion (e.g., about 50 percent) of the Co in $PrCoO_3$ perovskite with Ni significantly reduces oxygen vacancy formation energies and permits $H_2O$ insertion at the oxide surface that facilitates $H^+$ conduction. Accordingly, PNC has improved hydration activity and stability in $H_2O$ relative to many conventional perovskites (e.g., $PrCoO_3$, rare-earth-element-based perovskites, etc.).

With returned reference to FIG. 1, the proton-conducting membrane 104 of the electrochemical cell 100 may be formed of and include at least one electrolyte material compatible with the material compositions of the first electrode 102 and the second electrode 106 under the operating conditions (e.g., temperature, pressure, current density, etc.) of the electrochemical cell 100. The electrolyte material of the proton-conducting membrane 104 may be formulated to remain substantially adhered (e.g., laminated) to the first electrode 102 and the second electrode 106 at relatively high current densities, such as at current densities greater than or equal to about 0.1 amperes per square centimeter ($A/cm^2$) (e.g., greater than or equal to about 0.5 $A/cm^2$, greater than or equal to about 1.0 $A/cm^2$, greater than or equal to about 2.0 $A/cm^2$, etc.). In some embodiments, the electrolyte material of the proton-conducting membrane 104 comprises a perovskite having an ionic conductivity (e.g., $H^+$ conductivity) greater than or equal to about $10^{-2}$ S/cm (e.g., within a range of from about $10^{-2}$ S/cm to about 1 S/cm) at one or more temperatures within a range of from about 400° C. to about 600° C.

By way of non-limiting example, the proton-conducting membrane 104 may comprise one or more a yttrium and ytterbium-doped barium-cerate-zirconate (BCZYYb), such as $BaZr_{0.8-y}Ce_yY_{0.2-x}Yb_xO_{3-\delta}$, wherein x and y are dopant levels and δ is the oxygen deficit (e.g., $BaCe_{0.4}Zr_{0.4}Y_{0.1}Yb_{0.1}O_{3-\delta}$ (BCZYYb4411), $BaCe_{0.5}Zr_{0.3}Y_{0.1}Yb_{0.1}O_{3-\delta}$ (BCZYYb5311), $BaCe_{0.7}Zr_{0.1}Y_{0.1}Yb_{0.1}O_{3-\delta}$ (BCZYYb7111)); a yttrium and ytterbium-doped barium-strontium-niobate (BSNYYb), such as $Ba_3(Sr_{1-x}Nb_{2-y}Y_xYb_y)O_{9-\delta}$, wherein x and y are dopant levels and δ is the oxygen deficit; doped barium-cerate ($BaCeO_3$) (e.g., yttrium-doped $BaCeO_3$ (BCY)); doped barium-zirconate ($BaZrO_3$) (e.g., yttrium-doped $BaCeO_3$ (BZY)); barium-yttrium-stannate ($Ba_2(YSn)O_{5.5}$); and barium-calcium-niobate ($Ba_3(CaNb_2)O_9$). In some embodiments, the proton-conducting membrane 104 comprises BCZYYb (e.g., BCZYYb4411).

The second electrode 106 (e.g., $H_2$ gas side electrode) of the electrochemical cell 100 may be formed of and include material compatible with the material compositions of the first electrode 102 and the proton-conducting membrane 104 under the operating conditions (e.g., temperature, pressure, current density, etc.) of the electrochemical cell 100. The material composition of the second electrode 106 may permit the production of $H_2$ gas from steam when the electrochemical cell 100 is operated in electrolysis mode at an operational temperature within the range of from about 400° C. to about 600° C., and may also permit electricity generation from $H_2$ gas when the electrochemical cell 100 is operated in fuel cell mode at an operational temperature within the range of from about 400° C. to about 600° C.

By way of non-limiting example, the second electrode 106 may comprise a cermet material including at least one metal (e.g., Ni) and at least one perovskite, such as a nickel/perovskite cermet (Ni-perovskite) material (e.g., Ni—BCZYYb, such as Ni—BCZYYb4411, BCZYYb3511, Ni—BCZYYb1711; Ni—BSNYYb; Ni—$BaCeO_3$; Ni—$BaZrO_3$; Ni—$Ba_2(YSn)O_{5.5}$; Ni—$Ba_3(CaNb_2)O_9$). In some embodiments, the second electrode 106 comprises Ni—BCZYYb (e.g., Ni—BCZYYb4411).

The first electrode 102, the second electrode 106, and the proton-conducting membrane 104 may each individually exhibit any desired dimensions (e.g., length, width, thickness) and any desired shape (e.g., a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shapes of the first electrode 102, the second electrode 106, and the proton-conducting membrane 104 may be selected relative to one another such that the proton-conducting membrane 104 substantially intervenes between opposing surfaces of the first electrode 102 and the second electrode 106. In some embodiments, the first electrode 102 and the second electrode 106 each individually exhibit a thickness within a range of from about 10 micrometers (μm) to about 1000 μm; and the proton-conducting membrane 104 exhibit a thickness within a range of from about 5 μm to about 1000 μm.

In some embodiments, the first electrode 102 exhibits a mesh configuration (e.g., woven fabric configuration) of the triple conducting perovskite (e.g., PNC) thereof. For example, the first electrode 102 may comprise a three-dimensional (3D) nanofiber-structured mesh of the triple conducting perovskite. The 3D nanofiber-structured mesh may include multiple tows (e.g., a substantially unidirectional bundles) of nanofibers of the triple conducting perovskite interweaved together (e.g., as a plain weave of the multiple tows, as a 4 harness satin weave of the multiple tows, as a 5 harness satin weave of the multiple tows, as a 8 harness satin weave of the multiple tows, etc.). As used herein, the term "nanofiber" means and includes an elongated structure having a cross-sectional width (e.g., cross-sectional diameter) of less than about 1000 nanometers (nm) (e.g., less than one micrometer (μm)), such less than or equal to about 500 nm. Nanofibers include structures that are hollow (e.g., nanotubes), and structures that are substantially free of void spaces. The nanofibers may be formed of and include a plurality of nanoparticles of the triple conducting perovskite. The nanoparticles of the triple conducting perovskite may, for example, have an average particle size within a range of from about 10 nm to about 100 nm, such as within a range of from about 15 nm to about 75 nm, from about 20 to about 50 nm, or about 50 nm. The tows of the nanofibers may exhibit micro-sized cross-sectional widths (e.g., cross-sectional diameters). For example, individual tows of the nanofibers may exhibit a cross-sectional width (e.g., a cross-sectional diameter) within a range of from about 1 μm to about 10 μm, such as from about 2 μm to about 9 μm, from about 3 μm to about 8 μm, or from about 4 μm to about 7 μm. Individual tows of the nanofibers may be substantially hollow, such that the tow of the nanofibers is substantially free of nanofibers at and proximate a cross-sectional center thereof across a length of the tow of the nanofibers; or may be substantially solid, such that the tow of the nanofibers includes nanofibers at and/or proximate the cross-sectional center thereof across a length of the tow of the nanofibers. In some embodiments, one or more (e.g., each) individual tows of the nanofibers exhibit a through hole (e.g., a through opening) extending throughout a length thereof. The through hole may, for example, have a diameter within a range of from about 1 μm to about 5 μm, such as from about 2 μm to about 4 μm, from about 2 μm to about 3 μm, or about 3 μm.

The electrochemical cell 100, including the first electrode 102, the proton-conducting membrane 104, and the second electrode 106 thereof, may be formed using conventional processes (e.g., rolling process, milling processes, shaping processes, pressing processes, consolidation processes, etc.), which are not described in detail herein. The electrochemical cell 100 may be mono-faced or bi-faced, and may have a prismatic, folded, wound, cylindrical, or jelly rolled configuration.

Figure 3:
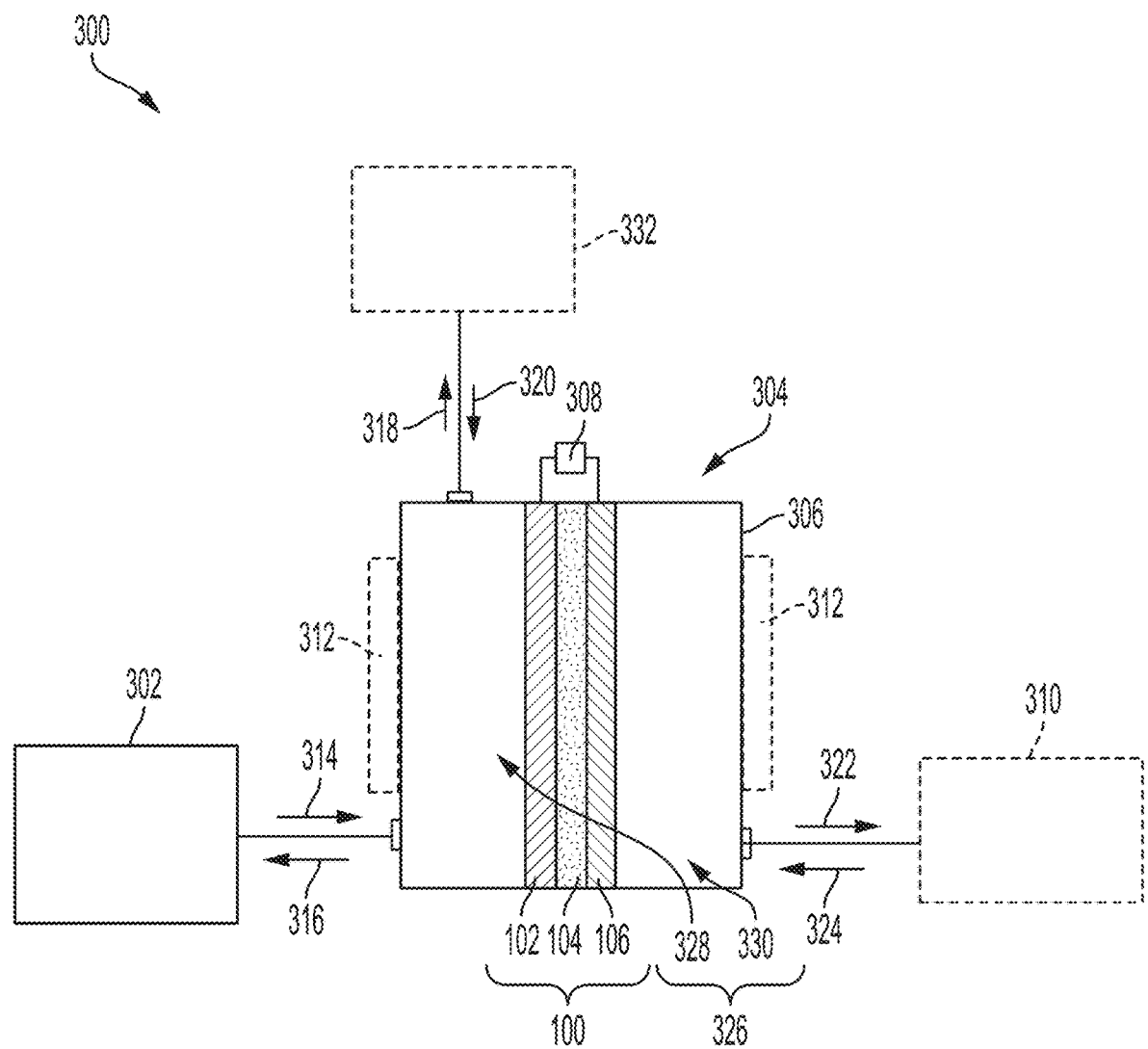
FIG. 3 is a simplified schematic view of a system for $H_2$ gas production and electricity generation including the electrochemical cell shown in FIG. 1, in accordance with an embodiment of the disclosure.

Electrochemical cells (e.g., the electrochemical cell 100) in accordance with embodiments of the disclosure may be used in embodiments of $H_2$ gas production and electricity generation systems of the disclosure. For example, FIG. 3 schematically illustrates a system 300 for producing $H_2$ gas and generating electricity, according to embodiments of disclosure. As shown in FIG. 1, the system 300 includes at least one steam source 302, and at least one electrochemical apparatus 304 in fluid communication with the steam source 302. The electrochemical apparatus 304 includes a housing structure 306, and one or more embodiments of the electrochemical cell 100 previously described with reference to FIG. 1 contained within the housing structure 306. The electrochemical cell 100 is electrically connected (e.g., coupled) to a power source 308, and includes the first electrode 102 (e.g., steam side electrode), the second electrode 106 (e.g., $H_2$ gas side electrode), and the proton-conducting membrane 104 between the first electrode 102 and the second electrode 106. As shown in FIG. 3, optionally, the system 300 may also include one or more of at least one $H_2$ gas source 310 in fluid communication with the electrochemical apparatus 304, at least one $O_2$ gas source 332 in fluid communication with the electrochemical apparatus 304, and at least one heating apparatus 312 operatively associated with the electrochemical apparatus 304.

The steam source 302 comprises at least one apparatus configured and operated to produce a steam stream 314 including steam (e.g., gaseous $H_2O$). The steam stream 314 may be directed into the electrochemical apparatus 304 from the steam source 302 to interact with the first electrode 102 of the electrochemical cell 100 therein when the electrochemical cell 100 is operated in electrolysis mode, as described in further detail below. The steam source 302 may also receive an $H_2O$ stream 316 containing one or more phases of $H_2O$ (e.g., steam) exiting the electrochemical apparatus 304 when the electrochemical cell 100 is operated in fuel cell mode, as also described in detail herein. By way of non-limiting example, the steam source 302 may comprise a boiler apparatus configured and operated to heat liquid $H_2O$ to a temperature greater than or equal to 100° C. In some embodiments, the steam source 302 is configured and operated to convert the liquid $H_2O$ to steam having a temperature within a range of an operating temperature of the electrochemical cell 100 of the electrochemical apparatus 304, such as a temperature within a range of from about 400° C. to about 600° C. In some embodiments, the steam source 302 is configured and operated to convert the liquid $H_2O$ into steam having a temperature below the operating temperature of the electrochemical cell 100. In such embodiments, the heating apparatus 312 may be employed to further heat the steam stream 314 to the operational temperature of the electrochemical cell 100, as described in further detail below.

The electrochemical apparatus 304, including the housing structure 306 and the electrochemical cell 100 thereof, is configured and operated to facilitate the production of $H_2$ gas from steam (e.g., steam of the steam stream 314) when the electrochemical cell 100 is operated in electrolysis mode, and to facilitate the electricity generation from $H_2$ gas (e.g., the $H_2$ gas produced when the electrochemical cell 100 is operated in electrolysis mode) when the electrochemical cell 100 is operated in fuel cell mode. The housing structure 306 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the electrochemical cell 100 therein. In addition, the housing structure 306 is configured, such that when the electrochemical cell 100 is operated in electrolysis mode, the housing structure 306 may receive and directs the steam stream 314 to the first electrode 102 of the electrochemical cell 100, may direct $O_2$ gas produced at the first electrode 102 of the electrochemical cell 100 away from the electrochemical apparatus 304 as an $O_2$ gas stream 318, and may optionally direct $H_2$ gas produced at the second electrode 106 of the electrochemical cell 100 away from the electrochemical apparatus 304 as an $H_2$ gas stream 322. The housing structure 306 may also be configured, such that when the electrochemical cell 100 is operated in fuel cell mode, the housing structure 306 may receive and direct a $H_2$ gas containing stream 324 to the second electrode 106 of the electrochemical cell 100, may receive and direct a $O_2$ gas containing stream 320 to the first electrode 102 of the electrochemical cell 100, and may direct $H_2O$ produced at the first electrode 102 of the electrochemical cell 100 away from the electrochemical apparatus 304 as an $H_2O$ stream 316. The housing structure 306 may be formed of and include any material (e.g., glass, metal, alloy, polymer, ceramic, composite, combination thereof, etc.) compatible with the operating conditions (e.g., temperatures, pressures, etc.) of the electrochemical apparatus 304.

The housing structure 306 of the electrochemical apparatus 304 may at least partially define at least one internal chamber 326 at least partially surrounding the electrochemical cell 100. The electrochemical cell 100 may serve as a boundary between a first region 328 (e.g., a steam region) of the internal chamber 326 configured and positioned to temporarily contain steam, and a second region 330 (e.g., an $H_2$ gas region) of the internal chamber 326 configured and positioned to temporarily contain $H_2$ gas. $H_2O$ (e.g., steam) may be substantially limited to the first region 328 of the internal chamber 326 by the configurations and positions of the housing structure 306 and the electrochemical cell 100. Keeping the second region 330 of the internal chamber 326 substantially free of the $H_2O$ circumvents additional processing of produced $H_2$ gas (e.g., to separate the produced $H_2$ gas from steam) that may otherwise be necessary if the $H_2O$ (e.g., steam) was provided within the second region 330 of the internal chamber 326. In addition, protecting the second electrode 106 of the electrochemical cell 100 from exposure to $H_2O$ may enhance the operational life (e.g., durability) of the electrochemical cell 100 as compared to conventional electrochemical cells by preventing undesirable oxidation of the second electrode 106 that may otherwise occur in the presence of $H_2O$.

Although the electrochemical apparatus 304 is depicted as including a single (i.e., only one) electrochemical cell 100 in FIG. 3, the electrochemical apparatus 304 may include any number of electrochemical cells 100. Put another way, the electrochemical apparatus 304 may include a single (e.g., only one) electrochemical cell 100, or may include multiple (e.g., more than one) electrochemical cells 100. If the electrochemical apparatus 304 includes multiple electrochemical cells 100, each of the electrochemical cells 100 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrochemical cells 100 may be different (e.g., exhibit one or more of different components, different component sizes, different component shapes, different component material compositions, different component material distributions, different component positions, different component orientations, etc.) than at least one other of the electrochemical cells 100 and/or may be operated under different conditions (e.g., different temperatures, different pressures, different flow rates, etc.) than at least one other of the electrochemical cells 100. By way of non-limiting example, one of the electrochemical cells 100 may be configured for and operated under a different temperature (e.g., different operating temperature resulting from a different material composition of one of more components thereof) than at least one other of the electrochemical cells 100. In some embodiments, two of more electrochemical cells 100 are provided in parallel with one another within the housing structure 306 of the electrochemical apparatus 304.

Although the system 300 is depicted as including a single (i.e., only one) electrochemical apparatus 304 in FIG. 3, the system 300 may include any number of electrochemical apparatuses 304. Put another way, the system 300 may include a single (e.g., only one) electrochemical apparatus 304, or may include multiple (e.g., more than one) electrochemical apparatuses 304. If the system 300 includes multiple electrochemical apparatuses 304, each of the electrochemical apparatuses 304 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrochemical apparatus 304 may be different (e.g., exhibit one or more of different components, different component sizes, different component shapes, different component material compositions, different component material distributions, different component positions, different component orientations, etc.) than at least one other of the electrochemical apparatuses 304 and/or may be operated under different conditions (e.g., different temperatures, different pressures, different flow rates, etc.) than at least one other of the electrochemical apparatuses 304. By way of non-limiting example, one of the electrochemical apparatuses 304 may be configured for and operated under a different temperature (e.g., a different operating temperature resulting from a different material composition of one of more components of one or more electrochemical cell(s) 100 thereof) than at least one other of the electrochemical apparatuses 304. In some embodiments, two of more electrochemical apparatuses 304 are provided in parallel with one another. In some embodiments, two of more electrochemical apparatuses 304 are provided in series with one another.

The power source 308 may comprise one or more of a device, structure, and apparatus able to apply a potential difference (e.g., voltage) between the first electrode 102 of the electrochemical cell 100 and the second electrode 106 of the electrochemical cell 100 to facilitate desired operation (e.g., electrolysis mode operation, fuel cell mode operation) of the electrochemical cell 100. During electrolysis mode operation of the electrochemical cell 100, the potential difference applied between the first electrode 102 and the second electrode 106 permits the first electrode 102 to serve as the positive electrode (e.g., anode) and the second electrode 106 to serve as the negative electrode (e.g., cathode) to facilitate water splitting reaction (WSR) and the production of $H_2$ gas from steam, as described in further detail below. During fuel cell mode operation of the electrochemical cell 100, the potential difference applied between the first electrode 102 and the second electrode 106 permits the second electrode 106 to serve as the positive electrode (e.g., anode) and the first electrode 102 to serve as the negative electrode (e.g., cathode) to facilitate oxygen reduction reaction (ORR) and the electricity generation using $H_2$ gas as a fuel, as also described in further detail below. The power source 308 may, for example, comprise one or more of a device, structure, or apparatus configured and operated to exploit one or more of solar energy, wind (e.g., wind turbine) energy, hydropower energy, geothermal energy, nuclear energy, combustion-based energy, and waste heat (e.g., heat generated from one or more of an engine, a chemical process, and a phase change process) to apply a potential difference between the first electrode 102 and the second electrode 106 of the electrochemical cell 100.

The heating apparatus 312, if present, may comprise at least one apparatus (e.g., one or more of a combustion heater, an electrical resistance heater, an inductive heater, and an electromagnetic heater) configured and operated to heat one or more of at least a portion of the electrochemical apparatus 304 and one or more of the streams (e.g., one or more of the steam stream 314, the $H_2$ gas containing stream 324, and the $O_2$ gas containing stream 320) directed into the electrochemical apparatus 304 during desired operation (e.g., electrolysis mode operation, fuel cell mode operation) of the electrochemical cell 100 to an operating temperature of the electrochemical apparatus 304. The operating temperature of the electrochemical apparatus 304 may at least partially depend on the material compositions of the first electrode 102, the proton-conducting membrane 104, and the second electrode 106 thereof. In some embodiments, the heating apparatus 312 heats one or more of at least a portion of the electrochemical apparatus 304 and one or more of the streams directed into the electrochemical apparatus 304 to a temperature within a range of from about 400° C. to about 600° C. In additional embodiments, such as in embodiments wherein a temperature of the streams directed is already within the operating temperature range of the electrochemical cell 100 of the electrochemical apparatus 304, the heating apparatus 312 may be omitted (e.g., absent) from the system 300.

The $H_2$ gas source 310, if present, may comprise one or more of a device, structure, and apparatus configured and operated to produce an $H_2$ gas containing stream 324 including $H_2$ gas. The $H_2$ gas containing stream 324 may be directed into the electrochemical apparatus 304 from the $H_2$ gas source 310 to interact with the second electrode 106 of the electrochemical cell 100 therein when the electrochemical cell 100 is operated in fuel cell mode, as described in further detail below. The $H_2$ gas source 310 may also receive and temporarily store (e.g., contain) one or more portions of the $H_2$ gas stream 322 including $H_2$ gas exiting the electrochemical apparatus 304 when the electrochemical cell 100 is operated in electrolysis mode, as also described in detail herein. The $H_2$ gas exiting the electrochemical apparatus 304 in the $H_2$ gas stream 322 during electrolysis mode operation of the electrochemical cell 100 may be employed as at least a portion of the $H_2$ gas of the $H_2$ gas containing stream 324 being directed into the electrochemical apparatus 304 when the electrochemical cell 100 is operated in fuel cell mode. In additional embodiments, such as in embodiments wherein the electrochemical cell 100 is rapidly switched (e.g., in under five (5) minutes, such as in under two (2) minutes, or in under one (1) minute) between electrolysis mode operation and fuel cell mode operation, the $H_2$ gas source 310 may be omitted. In such embodiments, the at least a portion (e.g., substantially all) of the $H_2$ gas produced during electrolysis mode operation of the electrochemical cell 100 may be employed as fuel during fuel cell mode operation of the electrochemical cell 100 before the $H_2$ gas produced $H_2$ gas can exit the second region 330 of the internal chamber 326 of the housing structure 306.

The $O_2$ gas source 332, if present, may comprise one or more of a device, structure, and apparatus configured and operated to produce an $O_2$ gas containing stream 320 including $O_2$ gas. The $O_2$ gas containing stream 320 may be directed into the electrochemical apparatus 304 from the $O_2$ gas source 332 to interact with the first electrode 102 of the electrochemical cell 100 therein when the electrochemical cell 100 is operated in fuel cell mode, as described in further detail below. The $O_2$ gas source 332 may also receive and temporarily store (e.g., contain) one or more portions of the $O_2$ gas stream 318 including $O_2$ gas exiting the electrochemical apparatus 304 when the electrochemical cell 100 is operated in electrolysis mode, as also described in detail herein. The $O_2$ gas exiting the electrochemical apparatus 304 in the $O_2$ gas stream 318 during electrolysis mode operation of the electrochemical cell 100 may be employed as at least a portion of the $O_2$ gas of the $O_2$ gas containing stream 320 being directed into the electrochemical apparatus 304 when the electrochemical cell 100 is operated in fuel cell mode.

When the electrochemical cell 100 of the electrochemical apparatus 304 (and, hence, the electrochemical apparatus 304 itself) is operated in electrolysis mode, the system 300 directs the steam stream 314 from the steam source 302 and into the electrochemical apparatus 304 to interact with the first electrode 102 (e.g., steam side electrode) of the electrochemical cell 100 contained therein. A potential difference (e.g., voltage) is applied between the first electrode 102 (serving as an anode) and the second electrode 106 (serving as a cathode) by the power source 308 so that as steam interacts with the first electrode 102, H atoms of the steam release their electrons ($e^-$) to generate oxygen gas ($O_{2(g)}$), hydrogen ions ($H^+$) (i.e., protons), and electrons ($e^-$) according to the following equation:

$$2H_2O_{(g)} \rightarrow O_{2(g)} + 4H^+ + 4e^- \qquad (1).$$

The generated $H^+$ permeate (e.g., diffuse) across the proton-conducting membrane 104 to the second electrode 106, and the generated $e^-$ are directed to the power source 308 through external circuitry. The produced $O_2$ gas may exit the electrochemical apparatus 304 as an $O_2$ gas stream 318. At the second electrode 106, the generated $H^+$ exiting the proton-conducting membrane 104 react with $e^-$ received from the power source 308 to form H atoms which the combine to form $H_2$ gas ($H_{2(g)}$), according to the following equation:

$$4H^+ + 4e^- \rightarrow 2H_{2(g)} \qquad (2).$$

The produced $H_2$ gas may exit the electrochemical apparatus 304 as the $H_2$ gas stream 322.

When the electrochemical cell 100 of the electrochemical apparatus 304 (and, hence, the electrochemical apparatus 304 itself) is operated in fuel cell mode, the system 300 employs $H_2$ gas previously produced by the electrochemical cell 100 when operated in electrolysis mode and/or directed into electrochemical apparatus 304 (e.g., into the second region 330 thereof) from the $H_2$ gas source 310 as a gaseous $H_2$ stream 316 to interact with the second electrode 106 (e.g., $H_2$ gas side electrode) of the electrochemical cell 100. A potential difference (e.g., voltage) is applied between the second electrode 106 (serving as an anode) and the first electrode 102 (serving as a cathode) by the power source 308 so that as $H_2$ gas interacts with the second electrode 106, H atoms of the $H_2$ gas release their electrons ($e^-$) to generate hydrogen ions (H⁺) (i.e., protons) and electrons (e⁻) according to the following equation (the reverse reaction of Equation (2) above):

$$2H_{2(g)} \rightarrow 4H^+ + 4e^- \qquad (3)$$

The generated H⁺ permeate (e.g., diffuse) across the proton-conducting membrane 104 to the first electrode 102, and the generated e⁻ are directed to the power source 308 through external circuitry. At the first electrode 102, the generated H⁺ exiting the proton-conducting membrane 104 react with e⁻ received from the power source 308 and $O_2$ gas previously produced by the electrochemical cell 100 when operated in electrolysis mode and/or directed into electrochemical apparatus 304 (e.g., into the first region 328 thereof) from the $O_2$ gas source 332 as an $O_2$ gas containing stream 320 to generate electricity and produce $H_2O$, according to the following equation (the reverse reaction of Equation (1) above):

$$O_{2(g)} + 4H^+ + 4e^- \rightarrow 4H_2O \qquad (4).$$

The produced $H_2O$ may exit the electrochemical apparatus 304 as the $H_2O$ stream 316 and may be directed into the steam source 302, and/or may be employed to produce additional $H_2$ gas when the electrochemical cell 100 of the electrochemical apparatus 304 (and, hence, the electrochemical apparatus 304 itself) is operated in electrolysis mode.

Switching between electrolysis mode operation and fuel cell mode operation of the electrochemical cell 100 may be rapid (e.g., electrolysis and fuel cell operation modes may alternate between one another using relatively short time periods for each operation, such as time periods less than or equal to five (5) minutes, less than or equal to two (2) minutes, or less than or equal to one (1) minute), or may be delayed (e.g., the electrolysis and fuel cell operation modes may not alternate between one another using relatively short time periods). In some embodiments, such as embodiments wherein the electrochemical cell 100 is rapidly switched (e.g., cyclically alternated) between electrolysis mode operation and fuel cell mode operation, at least a portion (e.g., substantially all) of the $H_2$ gas produced during electrolysis mode operation of the electrochemical cell 100 is consumed as fuel during fuel cell mode operation of the electrochemical cell 100 before the produced $H_2$ gas can exit the electrochemical apparatus 304 as the $H_2$ gas stream 322. In additional embodiments, such as embodiments wherein the electrochemical cell 100 is not rapidly switched between electrolysis mode operation and fuel cell mode operation, at least a portion (e.g., substantially all) of the $H_2$ gas produced during electrolysis mode operation of the electrochemical cell 100 may exit the electrochemical apparatus 304 as the $H_2$ gas stream 322 and may be stored (e.g., at the $H_2$ gas source 310, if any) for subsequent use (e.g., for subsequent use as fuel during relatively delayed fuel cell mode operation of the electrochemical cell 100), as desired.

Still referring to FIG. 3, streams exiting the electrochemical apparatus 304 during the different modes of operation (e.g., electrolysis mode operation, fuel cell mode operation) of the electrochemical cell 100 thereof may individually be utilized or disposed of as desired. In some embodiments, one or more of the $H_2$ gas stream 322 and the $O_2$ gas stream 318 produced during electrolysis mode operation of the electrochemical cell 100 of the electrochemical apparatus 304 are respectively delivered into one or more storage vessels of the $H_2$ gas source 310 and the $O_2$ gas source 332 for subsequent use (e.g., to respectively form the $H_2$ gas containing stream 324 and the $O_2$ gas containing stream 320 employed during fuel cell mode operation of the electrochemical cell 100), as desired. In additional embodiments, the $H_2O$ stream 316 produced during fuel cell mode operation of the electrochemical cell 100 of the electrochemical apparatus 304 is delivered into one or more storage vessels of the steam source 302 for subsequent use (e.g., to form the steam stream 314 employed during electrolysis mode operation of the electrochemical cell 100), as desired. In further embodiments, at least a portion of one or more of the streams (e.g., the $H_2$ gas stream 322 and the $O_2$ gas stream 318) may be utilized (e.g., combusted) to heat one or more components (e.g., the heating apparatus 312 (if present); the electrochemical apparatus 304; etc.) and/or other streams (e.g., the steam stream 314) of the system 300. By way of non-limiting example, if the heating apparatus 312 (if present) is a combustion-based apparatus, at least a portion of one or more of the $H_2$ gas stream 322 and the $O_2$ gas stream 318 may be directed into the heating apparatus 312 and undergo an combustion reaction to efficiently heat the steam stream 314 entering the electrochemical apparatus 304 and/or at least a portion of the electrochemical apparatus 304 during electrolysis mode operation of the electrochemical cell 100. Utilizing the hydrocarbon $H_2$ gas stream 322 and/or the $O_2$ gas stream 318 as described above may reduce the electrical power requirements of the system 300 by enabling the utilization of direct thermal energy.

Thermal energy input into (e.g., through the heating apparatus 312 (if present)) and/or generated by the electrochemical apparatus 304 may also be used to heat one or more other components and/or streams of the system 300. As a non-limiting example, during electrolysis mode operation of the electrochemical cell 100 of the electrochemical apparatus 304, one or more of the $H_2$ gas stream 322 and the $O_2$ gas stream 318 exiting the electrochemical apparatus 304 may be directed into a heat exchanger configured and operated to facilitate heat exchange between the $H_2$ gas stream 322 and/or the $O_2$ gas stream 318 of the system 300 and one or more other relatively cooler streams (e.g., in some embodiments, the steam stream 314) of the system 300 to transfer heat from the $H_2$ gas stream 322 and/or the $O_2$ gas stream 318 to the relatively cooler stream(s) to facilitate the recovery of the thermal energy input into and generated within the electrochemical apparatus 304. The recovered thermal energy may increase process efficiency and/or reduce operational costs without having to react (e.g., combust) $H_2$ gas stream 322 and/or the $O_2$ gas stream 318. As another non-limiting example, during fuel cell mode operation of the electrochemical cell 100 of the electrochemical apparatus 304, the $H_2O$ stream 316 exiting the electrochemical apparatus 304 may be directed into a heat exchanger configured and operated to facilitate heat exchange between the $H_2O$ stream 316 of the system 300 and one or more other relatively cooler streams (e.g., in some embodiments, one or more of the $O_2$ gas containing stream 320 and the $H_2$ gas containing stream 324) of the system 300 to transfer heat from $H_2O$ stream 316 to the relatively cooler stream(s) to facilitate the recovery of the thermal energy input into and generated within the electrochemical apparatus 304. The recovered thermal energy may increase process efficiency and/or reduce operational costs without having to react (e.g., combust) one or more of the streams employed in the system 300.

The electrochemical cells (e.g., the electrochemical cell 100), structures (e.g., the first electrode 102), apparatuses (e.g., the electrochemical apparatus 304), systems (e.g., the system 300), and methods of the disclosure facilitate the simple and efficient $H_2$ gas production and electricity generation at intermediate temperatures, such as temperatures within a range of from about 400° to about 600° C. The electrochemical cells, structures, apparatuses, systems, and methods of the disclosure may reduce one or more of the time (e.g., processing steps), costs (e.g., material costs), and energy (e.g., thermal energy, electrical energy, etc.) required to produce $H_2$ gas and/or generate electricity relative to conventional electrochemical cells, structures, apparatuses, systems, and methods. The electrochemical cells, structures, apparatuses, systems, and methods of the disclosure may be more efficient, durable, and reliable that conventional electrochemical cells, conventional structures, conventional apparatuses, conventional systems, and conventional methods of $H_2$ gas production and electricity generation.

The following examples serve to explain embodiments of the disclosure in more detail. These examples are not to be construed as being exhaustive, exclusive, or otherwise limiting as to the scope of the disclosure.

EXAMPLES

Example 1: Synthesis of $PrNi_{0.5}Co_{0.5}O_{3-\delta}$ $PrNi_{0.5}Co_{0.5}O_{3-\delta}$ (PNC) was synthesized by a modified glycine-nitrate process (GNP). Stoichiometric amounts of $Pr(NO_3)_3 \cdot 6H_2O$ (Alfa Aesar, 99.9%, metal basis), $Ni(NO_3)_2 \cdot 6H_2O$ (Alfa Aesar, 99.9%), and $Co(NO_3)_2 \cdot 6H_2O$ (Aldrich, 98+%) were dissolved in distilled water; and glycine ($C_2H_5NO_2$) and citric acid ($C_6H_8O_7$) were added into aqeuous solution as chelating agents. The solution was heated up to 350° C. in air to form a viscous gel that was ignited to form a fine powder. The fine powder was then calcined at 1000° C. for 5 hour in air to form $PrNi_{0.5}Co_{0.5}O_{3-\delta}$.

Figure 4:
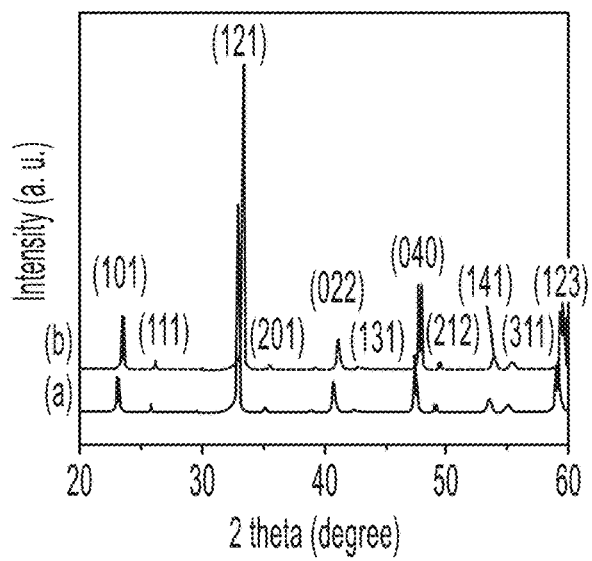
FIG. 4 is graphical representation showing results of powder X-ray diffraction (XRD) pattern analysis, as described in Example 2.

Example 2: $PrNi_{0.5}Co_{0.5}O_{3-\delta}$ Powder X-Ray Diffraction (XRD) Analysis Powder XRD analysis was also performed on the $PrNi_{0.5}Co_{0.5}O_{3-\delta}$ (PNC) synthesized in accordance with Example 1. The powder XRD analysis was performed after calcining at 1000° C. for 5 h in air, and after calcining in humidified air (50% $H_2O$, 600° C.) for 200 h. FIG. 4 shows the XRD patterns (a) after calcining at 1000° C. for 5 h in air, and (b) after calcining in humidified air (50% $H_2O$, 600° C.) for 200 h.

The existence of several weak diffraction peaks in the XRD patterns suggests the $PrNi_{0.5}Co_{0.5}O_{3-\delta}$ powder does not crystallize in a cubic or rhombohedral structure. Instead, the diffraction peaks can be readily indexed to a pure orthorhombic perovskite phase. In addition, the lack of any substantial changes in the XRD pattern after calcining in humidified air (relative to the XRD pattern after calcining in air) indicates neglected interaction between $PrNi_{0.5}Co_{0.5}O_{3-\delta}$ and steam at an operating temperature of about 600° C.

Example 3: $PrNi_{0.5}Co_{0.5}O_{3-\delta}$ Characterization

The characteristics of the $PrNi_{0.5}Co_{0.5}O_{3-\delta}$ (PNC) synthesized in accordance with Example 1 were analyzed using transmission electron microscopy (TEM), energy dispersive X-ray (EDX), lattice-resolved high resolution TEM (HR-TEM), selected area electro diffraction (SAED), and high-angle annular dark-field imaging scanning transmission electron microscopy (HAADF STEM).

Figure 5:
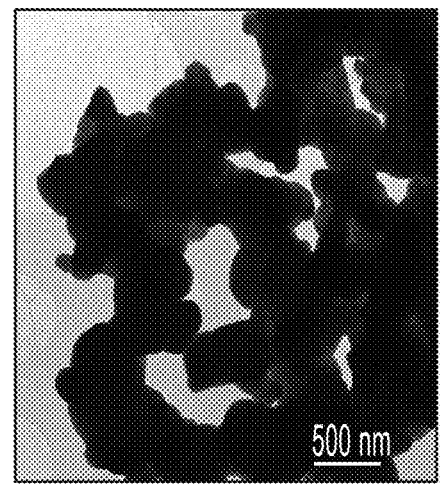
FIG. 5 is a transmission electron microscopy (TEM) image of synthesized $PrNi_{0.5}Co_{0.5}O_{3-\delta}$, as described in Example 3.

FIG. 5 is a TEM image of the synthesized $PrNi_{0.5}Co_{0.5}O_{3-\delta}$. As shown in FIG. 5, particle sizes of the $PrNi_{0.5}Co_{0.5}O_{3-\delta}$ were from about 20 nanometers (nm) to about 100 nm, with substantially uniform size distribution.

Figure 6:
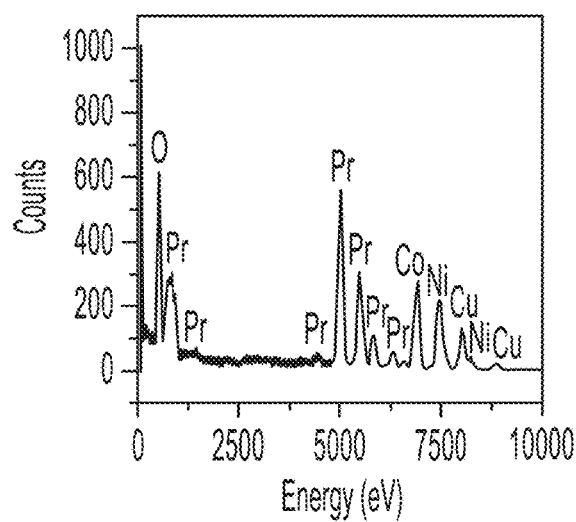
FIG. 6 is a graphical representation of an energy dispersive X-ray (EDX) scan of a particle surface of synthesized $PrNi_{0.5}Co_{0.5}O_{3-\delta}$, as described in Example 3.

FIG. 6 is a graphical representation of an EDX scan of a particle surface of the synthesized $PrNi_{0.5}Co_{0.5}O_{3-\delta}$. As shown in FIG. 6, the EDX scan revealed the presence of Pr, Ni, and Co.

Figure 7:
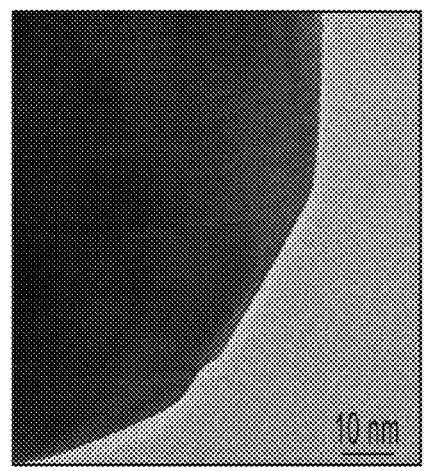
FIG. 7 is a lattice-resolved high resolution TEM (HR-TEM) image of a grain edge of synthesized $PrNi_{0.5}Co_{0.5}O_{3-\delta}$, as described in Example 3.

FIG. 7 is a HRTEM image of a grain edge of the synthesized $PrNi_{0.5}Co_{0.5}O_{3-\delta}$. The HRTEM image reveals a highly crystalline nature, which corresponds to the (101) crystal plane of perovskite structure with a lattice interplanar spacing of $d_{101}=0.387$ nm. SAED pattern analysis confirmed the long-range order crystal structure.

Figure 8:
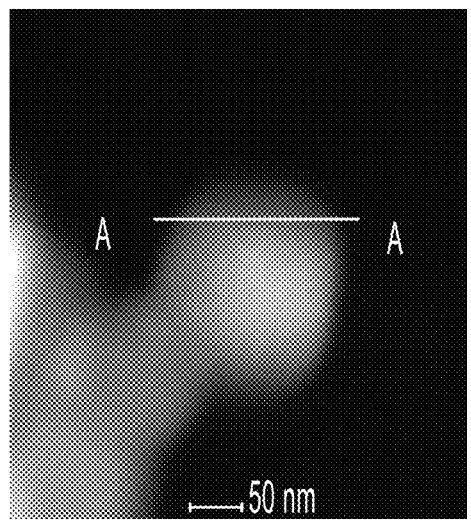
FIG. 8 is a high-angle annular dark-field imaging scanning transmission electron microscopy (HAADF STEM) image of a tip of a particle of synthesized $PrNi_{0.5}Co_{0.5}O_{3-\delta}$, as described in Example 3.
Figure 9:
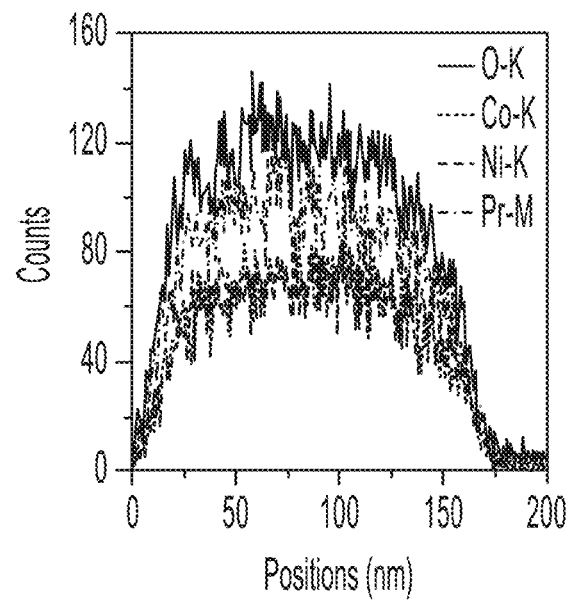
FIG. 9 is a graphical representation of an EDX line scan along a line A-A shown in FIG. 8, as described in Example 3.

FIG. 8 is a HAADF STEM image of a tip of a particle of the synthesized $PrNi_{0.5}Co_{0.5}O_{3-\delta}$. FIG. 9 is a graphical representation of an EDX line scan along the line A-A shown in FIG. 8. As shown in FIG. 9, the EDX line scan revealed the presence of three cations in the tip of the particle.

Figure 10:
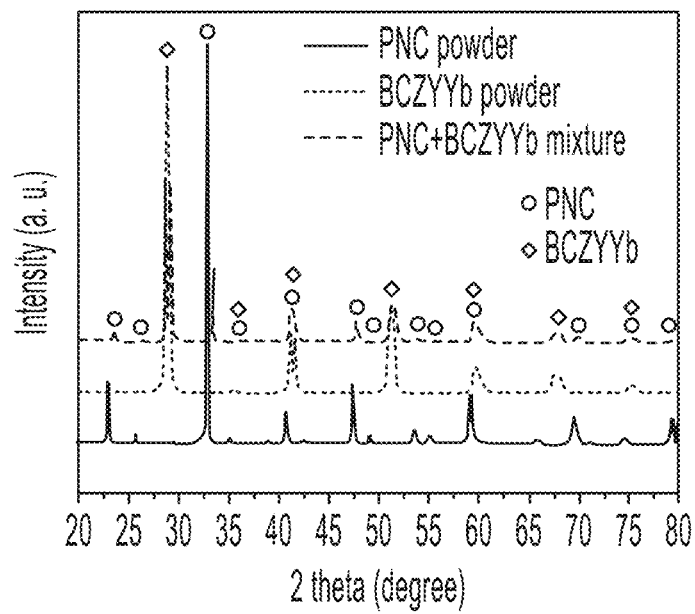
FIG. 10 is graphical representation showing results of powder XRD pattern analysis on $PrNi_{0.5}Co_{0.5}O_{3-\delta}$ chemical compatibility with yttrium and ytterbium-doped barium-zirconate-cerate, as described in Example 4.

Example 4: $PrNi_{0.5}Co_{0.5}O_{3-\delta}$ and BCZYYb4411 Compatibility Analysis The chemical compatibility of a $PrNi_{0.5}Co_{0.5}O_{3-\delta}$ (PNC) electrode and BCZYYb4411 electrolyte was investigated using powder XRD analysis. A powder mixture including 50 wt % $PrNi_{0.5}Co_{0.5}O_{3-\delta}$ and 50 wt % BCZYYb4411 was calcining at 1000° C. for 5 h in air, and was then subjected to powder XRD analysis. FIG. 10 shows the resulting XRD patterns. The results confirm chemical compatibility between $PrNi_{0.5}Co_{0.5}O_{3-\delta}$ electrode and BCZYYb4411 electrolyte.

Figure 12:
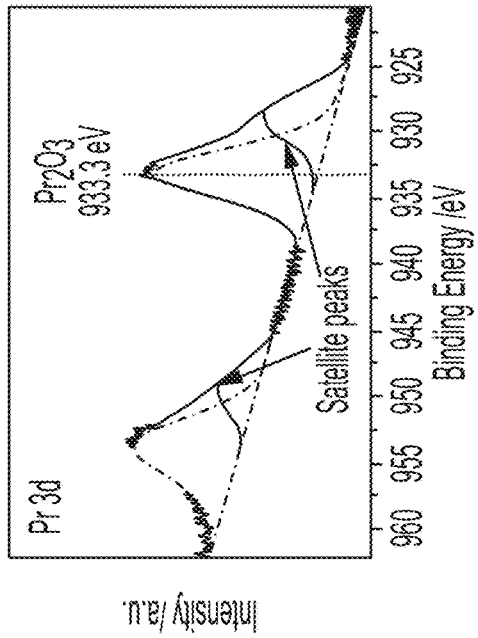
FIGS. 11 through 14 show the X-ray photoelectron spectroscopy (XPS) survey scan (FIG. 11), Pr 3d XPS spectra (FIG. 12), Ni 2p XPS spectra (FIG. 13), and Co 2p XPS spectra (FIG. 14) results for $PrNi_{0.5}Co_{0.5}O_{3-\delta}$ powder, as described in Example 5.
Figure 14:
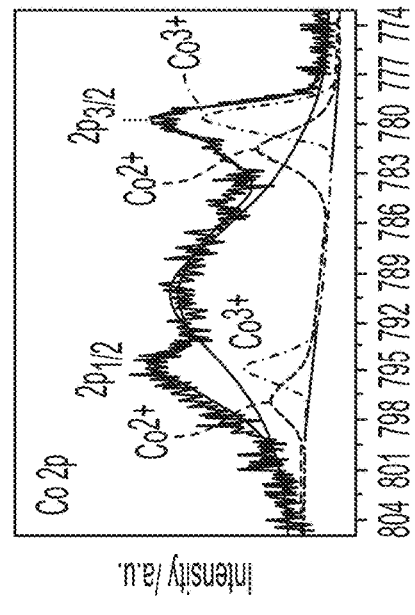
Figure 11:
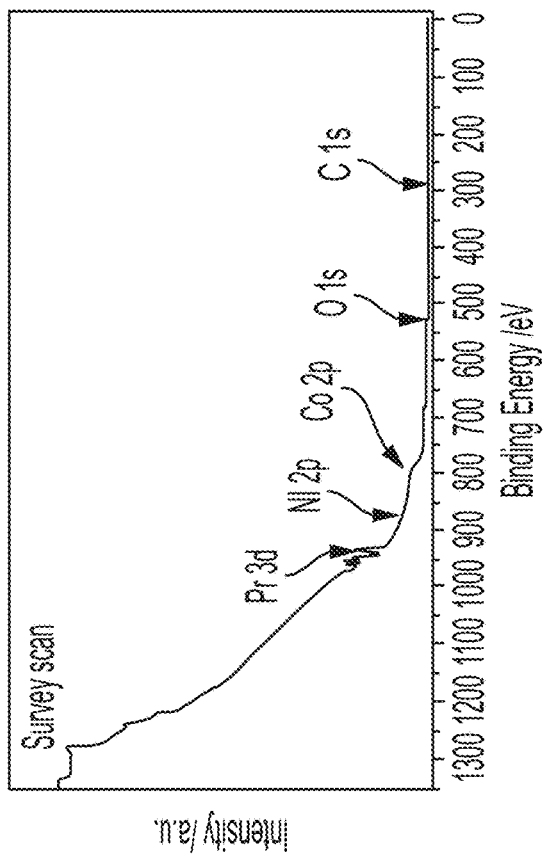
Figure 13:
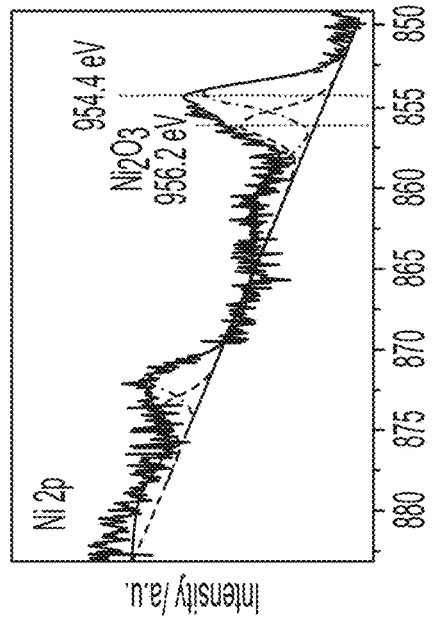

Example 5: $PrNi_{0.5}Co_{0.5}O_{3-\delta}$ X-Ray Photoelectron Spectroscopy (XPS) Analysis The surface of $PrNi_{0.5}Co_{0.5}O_{3-\delta}$ (PNC) particles was examined by XPS to determine the co-existence of Pr, Ni, Co, and O elements. FIG. 11 shows the resulting XPS survey scan. Thereafter detected valances of for Pr, Ni, and Co were further examined by XPS. FIGS. 12 through 14 show the resulting Pr 3d XPS spectra (FIG. 12), Ni 2p XPS spectra (FIG. 13), and Co 2p XPS spectra (FIG. 14). For Ni dopant, two main +2 and +3 valences were found with majority contributing to +2, indicating the formation of intrinsic oxygen vacancy with considerable concentration.

Example 6: $PrNi_{0.5}Co_{0.5}O_{3-\delta}$ Electrode Oxygen Vacancy and Hydration Analysis To confirm the formation of proton defects in $PrNi_{0.5}Co_{0.5}O_{3-\delta}$ (PNC) electrodes, density functional theory (DFT) calculations and thermogravimetry analysis (TGA) were used to evaluate the effect of equivalent element doping on oxygen vacancy formation and hydration behavior in wet condition.

In the orthorhombic Pbnm structure of $PrCoO_3$, Pr and Co atoms occupy the Wyckoff 4c (0.4925, −0.0371, ¼) and 4a (0, 0, 0) positions, respectively. Oxygen atoms occupy both the Wyckoff 4c (0.5723, 0.5088, ¼) and Wyckoff 8d (0.2827, 0.2172, 0.4608) positions (O1 and O2 sites), respectively. For the equilibrium lattice constants of $PrCoO_3$, GGA+U calculations gave a=5.42 Å, b=5.41 Å, and c=7.64 Å. In modeling the structure of $PrNi_{0.5}Co_{0.5}O_{3-\delta}$, four (4) Ni atoms were distributed among eight (8) available Co sites in a 40-atom supercell such that Ni and Co atoms form a pseudo-rocksalt lattice. Due to symmetry-lowering as a consequence of Ni substitution, the original Wyckoff 8d sites for oxygen in $PrCoO_3$ split into two symmetrically distinct Wyckoff 4e sites (O2 and O3 sites), respectively. The vacancy formation energies in different lattice oxygen positions (O1 and O2 for PrCoO$_3$; O1, O2, O3 for PrNi$_{0.5}$Co$_{0.5}$O$_{3-\delta}$) were obtained by removing a single neutral oxygen atom from the 160-atom PrCoO$_3$ or PrNi$_{0.5}$Co$_{0.5}$O$_{3-\delta}$ supercell. The formation energies of oxygen vacancies were calculated as:

$$DH_t^{Va} = E_{defect} - E_{perfect} + \tfrac{1}{2}E_{O2} \qquad (5),$$

where $E_{defect}$ is the total energy of the 160-atom supercell after oxygen removal, $E_{perfect}$ is the total energy of the 160-atom supercell before oxygen removal, and $E_{O2}$ is the energy of a spin polarized O$_2$ molecule in its ground state triplet state.

Figure 15:
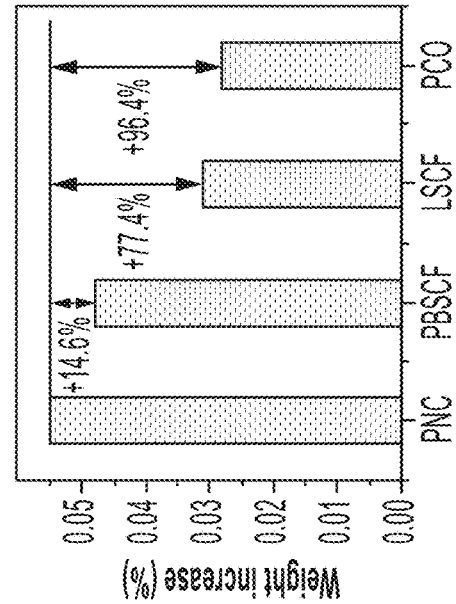
FIG. 15 is a graphical representation showing results of $PrNi_{0.5}Co_{0.5}O_{3-\delta}$ electrode analysis on oxygen vacancy formation energy, as described in Example 6.

FIG. 15 is a graphical representation of the results of the determined oxygen vacancy formation energies for the different lattice oxygen positions evaluated (O1 and O2 for PrCoO$_3$; O1, O2, O3 for PrNi$_{0.5}$Co$_{0.5}$O$_{3-\delta}$). As shown in FIG. 15, by effectively replacing 50% of Co sites in PrCoO$_3$ with Ni atoms, the oxygen vacancy formation energy of PrNi$_{0.5}$Co$_{0.5}$O$_{3-\delta}$ can be significantly decreased relative to PrCoO$_3$ (e.g., from 3.40 eV to 1.61 eV at O1 sites, and from 3.49 eV to 1.72 eV at O2 sites). Since the formation of oxygen vacancies is a prerequisite for H$_2$O dissociative incorporation into the defective lattice, the formation energy reduction may induce required H$_2$O hydration.

Figure 16:
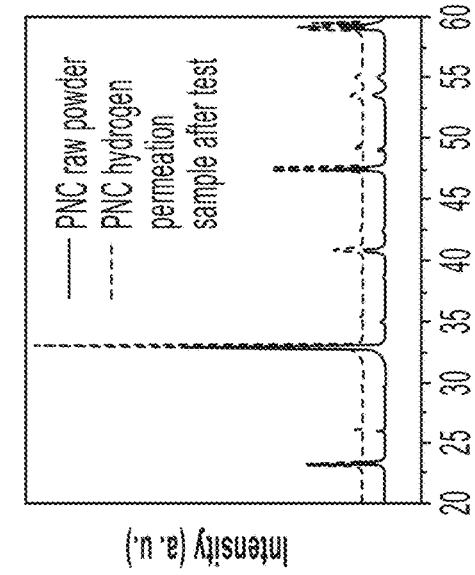
FIG. 16 is a graphical representation of a comparison of the hydration capability of $PrNi_{0.5}Co_{0.5}O_{3-\delta}$ relative to various conventional steam electrode materials, as described in Example 6.

In addition, the hydration capability of PrNi$_{0.5}$Co$_{0.5}$O$_{3-\delta}$ (PNC) was compared various conventional steam electrode materials. FIG. 16 is a graphical representation of the results of the comparison. As shown in FIG. 16, relative to layered perovskites, PrNi$_{0.5}$Co$_{0.5}$O$_{3-\delta}$ exhibited 0.035% weight increase at 500° C. after 10-hour dwelling time, and also exhibited higher water insertion of 0.055% at the same condition. PrNi$_{0.5}$Co$_{0.5}$O$_{3-\delta}$ also showed higher hydration ability than conventional La$_{0.6}$Sr$_{0.4}$Co$_{0.2}$Fe$_{0.8}$O$_3$ and PrCoO$_3$ (PCO) before Ni doping.

Example 7: PrNi$_{0.5}$Co$_{0.5}$O$_{3-\delta}$ Hydration Behavior and Post Hydrogen Permeation Chemical Stability The phase structure of a PrNi$_{0.5}$Co$_{0.5}$O$_{3-\delta}$ (PNC) powder was monitored during the process of changing air humidity from dry to wet (~3% H2O) to observe chemical expansion due to insertion of water into the crystal structure. Proton defects (OHO.) are formed in the PrNi$_{0.5}$Co$_{0.5}$O$_{3-\delta}$ by the Wagner hydration mechanism of Equation (6) below, in which water molecule combines with oxygen vacancy to generate two mobile protons in the anion sublattice.

Figure 17:
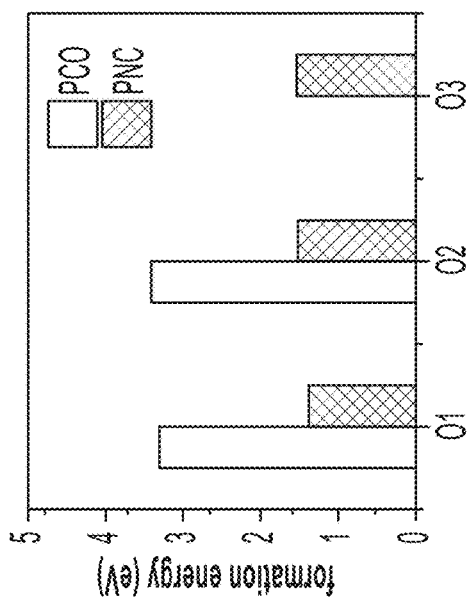
FIG. 17 is graphical representation showing results of XRD pattern analysis for $PrNi_{0.5}Co_{0.5}O_{3-\delta}$ powder exposed to wet air for different time periods, as described in Example 7.

High-temperature X-ray diffraction (XRD) was used to analyze chemical expansion due to the hydration process. FIG. 17 shows the results of the XRD pattern analysis at 600° C. As shown in FIG. 17, when the gas was switched from dry air to wet air, a clear shift of diffraction peaks towards the left side was observed, indicating the expansion of crystal structure.

Figure 18:
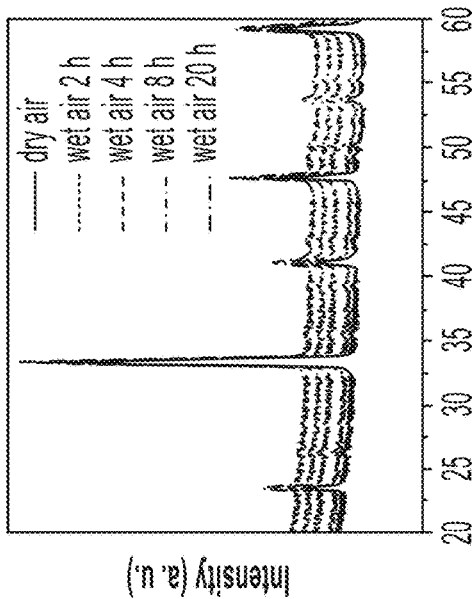
FIG. 18 is graphical representation showing results of XRD pattern analysis for $PrNi_{0.5}Co_{0.5}O_{3-\delta}$ powder before and after hydrogen permeation, as described in Example 7.

The chemical stability of PrNi$_{0.5}$Co$_{0.5}$O$_{3-\delta}$ before and after hydrogen permeation using 3% H$_2$ at 500° C. was also investigated using XRD pattern analysis. FIG. 18 depicts the results of the XRD pattern analysis. As shown in FIG. 18, no impurities were observed after exposing PrNi$_{0.5}$Co$_{0.5}$O$_{3-\delta}$ to 3% H$_2$ at 500° C.

Example 8: PrNi$_{0.5}$Co$_{0.5}$O$_{3-\delta}$ Electrode Proton Migration Analysis PrNi$_{0.5}$Co$_{0.5}$O$_{3-\delta}$ (PNC) electrodes were subjected to proton migration analysis using minimum energy path (MEP) calculations. FIGS. 19 and 20 are graphical representations of the MEP calculation results along two representative proton transfer pathways in bulk PrNi$_{0.5}$Co$_{0.5}$O$_{3-\delta}$. In the first path, depicted in FIG. 19, a proton jumps between two oxygen ion at O3 sites. In the second path, depicted in FIG. 20, a proton directly jumps between two oxygen ions at O3 sites via inter-octahedral hopping. For comparison, results for proton migration along the same paths in PrCoO$_3$ (PCO) are also shown in FIGS. 19 and 20. For both cases, the proton migration energy in PNC was significantly lower than that in PCO, suggesting the Ni doping can also accelerate proton transport through the bulk electrode, leading to improved performance in both electrolysis and fuel cell modes.

Example 9: Electrolysis Mode Performance of Electrochemical Cell

An electrochemical cell exhibiting the general configuration of the electrochemical cell 100 shown in FIG. 1, including a first electrode (steam side electrode) comprising PrNi$_{0.5}$Co$_{0.5}$O$_{3-\delta}$, a proton conducting membrane comprising BCZYYb4411, and a second electrode (H$_2$ gas side electrode) comprising Ni—BCZYYb4411 was subjected to H$_2$ gas production performance analysis during electrolysis mode operation of the electrochemical cell within a temperature range of from about 400° C. to about 600° C. Humid air (10% H$_2$O, 80 mL/min) and 10% H$_2$ gas were respectively fed to the first electrode and the second electrode. FIGS. 21 and 22 are graphical representations of the results of the analysis.

FIG. 21 is a graphical representation of current-voltage curves measured at different temperatures within the range of from 400° C. to 600° C. during operation of the electrochemical cell in electrolysis mode. In addition, FIG. 22 shows the electrochemical impedance spectra at different temperatures within the range of from 400° C. to 600° C. at 1.4V during electrolysis mode operation of the electrochemical cell. As shown in FIG. 21, at 1.4V, high current densities of 1.31 A cm$^{-2}$, 0.82 A cm$^{-2}$, and 0.62 A cm$^{-2}$ were achieved at 600° C., 550° C. and 500° C., respectively. When the operating temperature was further decreased to 400° C. and 450° C., the electrochemical cell still showed reasonable performance (e.g., 0.27 A cm$^{-2}$ at 450° C., and 0.15 A cm$^{-2}$ at 400° C.). At 1.6V and 450° C., the current density can reach 0.76 A cm$^{-2}$. The results demonstrate that PrNi$_{0.5}$Co$_{0.5}$O$_{3-\delta}$ is very active towards the water splitting reaction (WSR) at low temperatures. In addition, as indicated from the electrical impedance spectra shown in FIG. 22, the electrolyte resistances dominate total cell resistance, which is related to the conductivity and thickness of applied electrolyte; while the electrode polarization resistances from the electrodes are very small: 0.025 Ωcm$^2$, 0.075 Ωcm$^2$, and 0.13 Ωcm$^2$ at 600° C., 550° C., and 500° C., respectively. The lower operating temperature not only promotes thermal energy efficiency and material durability, but also results in higher current efficiency, as shown in Table 1 below, which summarizes Faraday efficiency at different applied voltages at 500° C. At 500° C., Faraday efficiency was as high as 99.5% at current density 0.17 A cm$^{-2}$; 97.8% at 0.43 A cm$^{-2}$, and 95% at 0.80 A cm$^{-2}$, respectively.

TABLE 1

|  | Applied voltage/V | | |
|---|---|---|---|
|  | 1.2 | 1.4 | 1.6 |
| Current density/A cm$^{-2}$ | 0.17 | 0.43 | 0.80 |
| Faraday efficiency/% | 99.5 | 97.8 | 95.0 |

Example 10: Electrochemical Cell Stability and Durability in Electrolysis Mode

An electrochemical cell exhibiting the general configuration of the electrochemical cell 100 shown in FIG. 1, including a first electrode (steam side electrode) comprising $PrNi_{0.5}Co_{0.5}O_{3-\delta}$ (PNC), a proton conducting membrane comprising BCZYYb4411, and a second electrode ($H_2$ gas side electrode) comprising Ni—BCZYYb4411 was subjected to stability (e.g., short-term and longer-term) and durability analysis. Humid air (10% $H_2O$, 80 mL/min) and 10% $H_2$ gas were respectively fed to the first electrode and the second electrode.

Figure 23:
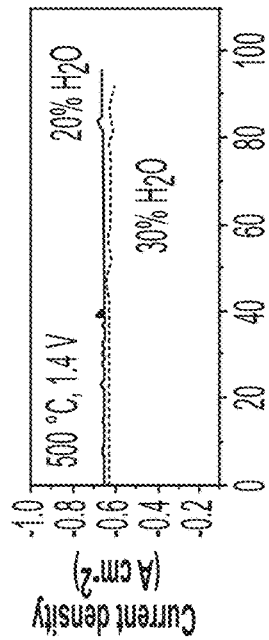
FIG. 23 is a graphical representation showing electrolysis long-term stability characteristics of an electrochemical cell of the disclosure at different voltages in the range of from 1.2V to 1.6V at 600° C., as described in Example 10.

FIG. 23 is a graphical representation of the longer-term electrolysis stability analysis that was performed, and shows the electrolysis characteristics of the electrochemical cell at different voltages in the range of from 1.2V to 1.6V at 600° C. As shown in FIG. 23, the electrochemical cell exhibited improvement at each voltage, which may result from a decrease of interfacial electrode polarization, as indicated from the impedance spectra previously discussed with reference to FIG. 22.

Figure 24:
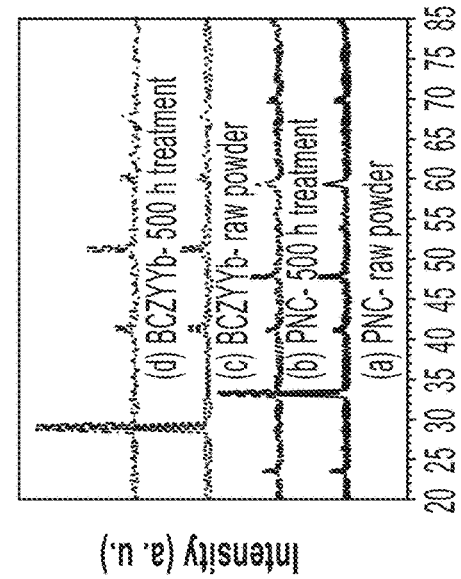
FIG. 24 is a graphical representation showing durability testing results for an electrochemical cell of the disclosure in electrolysis mode operation at 500° C. and 1.4V in different vapor pressures, as described in Example 10.

FIG. 24 is a graphical representation showing durability testing of the electrochemical cell at 500° C. and 1.4 in different vapor pressures (20% $H_2O$ and 30% $H_2O$) within the humid air fed to the first electrode. As shown in FIG. 24, the current density was relatively stable, and minor changes were caused by the slight fluctuation of steam supply, further indicating PNC's good chemical stability and interfacial binding with the BCZYYb4411 electrolyte in high-content steam. The small dependence of current density on steam concentration may be attributed to the electrochemical cell configuration with a thin layer of $PrNi_{0.5}Co_{0.5}O_{3-\delta}$ and small active area, in which the mass transport should not be the rate-limiting step as expected as the gas can be regarded as fully saturated.

Figure 25:
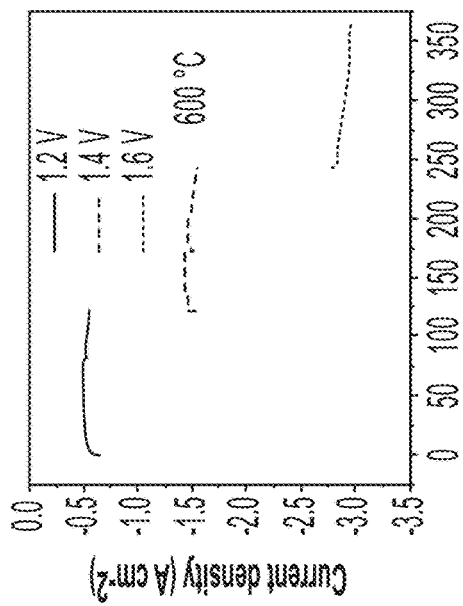
FIG. 25 is a graphical representation showing electrolysis characteristics of an electrochemical cell of the disclosure as the electrochemical cell was discharged at 1.4V and 1.6V for 120 h, as described in Example 10.

FIG. 25 is a graphical representation of the longer-term electrolysis stability analysis, and shows the electrolysis characteristics of the electrochemical cell as the electrochemical cell was discharged at 1.4V and 1.6V for 120 h. As shown in FIG. 25, the current density kept increasing by 10% and 8% after the electrolysis processes.

Figure 26:
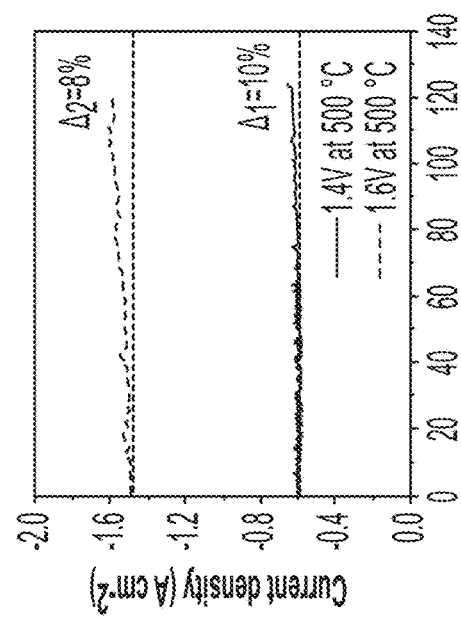
FIG. 26 is graphical representation showing results of powder XRD pattern analysis performed on electrode and electrolyte materials of an electrochemical cell of the disclosure before and after treatment in water at 500° C., as described in Example 10.

The chemical stability of the first electrode (including $PrNi_{0.5}Co_{0.5}O_{3-\delta}$) electrode and the proton conducting membrane (including BCZYYb4411) and the activity stability of the electrochemical cell was also investigated using powder XRD analysis. FIG. 26 shows the resulting XRD patterns. The XRD patterns reveal no chemical reaction between PNC/BCZYYb and steam at operating temperature over 500 hours.

Figure 27:
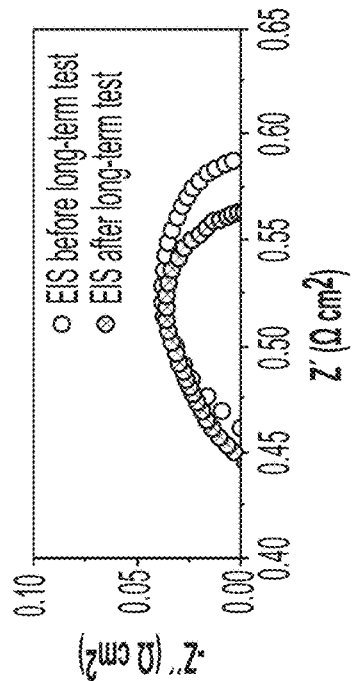
FIG. 27 is graphical representation showing area specific resistances (ASRs) stability of a $PrNi_{0.5}Co_{0.5}O_{3-\delta}$ electrode of an electrochemical cell of the disclosure at different temperatures and water pressures, as described in Example 10.

FIG. 27 is a graphical representation showing area specific resistances (ASRs) stability of the first electrode (including $PrNi_{0.5}Co_{0.5}O_{3-\delta}$) at 500° C. and 600° C. and elevated water pressures (10%, 20%, and 50% H2O) over hundreds of hours. As shown in FIG. 27, under 20% water pressure, the first electrode showed stable resistance, indicating strong electrode/electrolyte interfacial bonding.

Figure 28:
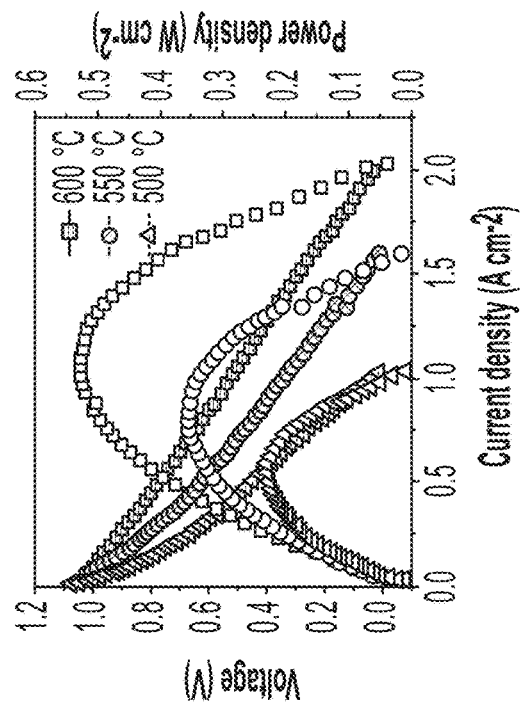
FIG. 28 shows the electrochemical impedance spectra of an electrochemical cell of the disclosure before and after long-term stability testing, as described in Example 10.

FIG. 28 shows the impedance spectra for the electrochemical cell before and after the long-term stability testing previously described with reference to FIG. 25. As shown in FIG. 28, high frequency Ohmic resistance and electrode polarization resistance both decreased after the testing (e.g., from 0.46 Ωcm$^2$ to 0.445 Ωcm$^2$). The results indicate material and interfacial stability during electrolysis reaction.

Figure 29:
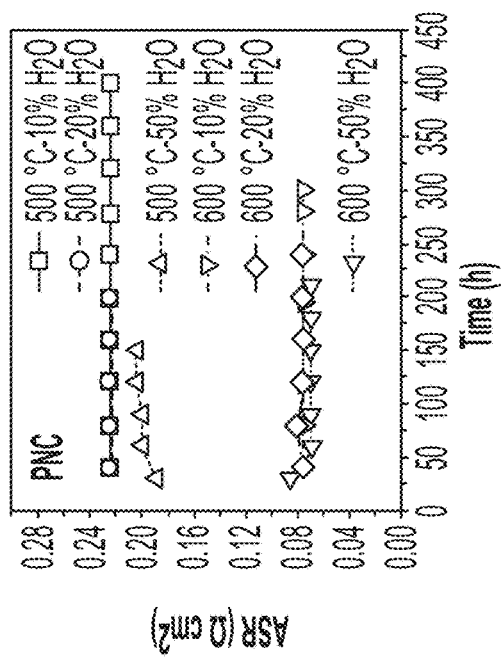
FIG. 29 is a graphical representation showing results of thermal cycle durability analysis of an electrochemical cell of the disclosure, as described in Example 10.

The thermal cycle durability of the electrochemical cell was also analyzed. Current density at 1.4V was measured as the temperature changed periodically. FIG. 29 is a graphical representation of the results of the analysis. As shown in FIG. 29, after five full cycles, the performance of the electrochemical cell didn't deteriorate, indicating favorable electrode/electrolyte adhesion and compatibility.

Example 11: Comparison of Electrolysis Mode Performance

The electrolysis mode performances of two different electrochemical cells exhibiting the general configuration of the electrochemical cell 100 shown in FIG. 1, including a first electrode (steam side electrode) comprising $PrNi_{0.5}Co_{0.5}O_{3-\delta}$ (PNC) in mesh form and non-mesh form, a proton conducting membrane comprising BCZYYb4411, and a second electrode ($H_2$ gas side electrode) comprising Ni—BCZYYb4111 were compared against the electrolysis mode performances of conventional electrochemical cell configurations. Table 2 below summarizes the results of the analysis. The results indicate that the electrolysis cell configuration of the disclosure exhibits improved performance (e.g., higher current density) and may employ lower operational temperatures (e.g., 600° C., 550° C., 500° C., 450° C., 400° C.) relative to conventional electrochemical cell configurations.

TABLE 2

| Proton-Conducting Membrane (Electrolyte) | First Electrode (Steam Side Electrode) | Second Electrode ($H_2$ Side Electrode) | Temp (° C.) | Steam Ratio | Applied Voltage (V) | Current Density (A/cm$^2$) |
|---|---|---|---|---|---|---|
| BCZYYb4111 | $PrNi_{0.5}Co_{0.5}O_{3-\delta}$ (mesh) | Ni-BCZYYb4411 | 600 | 10% | 1.3 | 1.18 |
|  |  |  | 550 |  |  | 0.56 |
|  |  |  | 500 |  |  | 0.23 |
| BCZYYb4111 | $PrNi_{0.5}Co_{0.5}O_{3-\delta}$ (non-mesh) | Ni-BCZYYb4411 | 600 | 10% | 1.3 | 0.86 |
|  |  |  | 550 |  |  | 0.36 |
|  |  |  | 500 |  |  | 0.07 |
| BCZYYb7111 | $BaCo_{0.4}Fe_{0.4}Zr_{0.1}O_{3-\delta}$ | Ni-BCZYYb7711 | 600 | 10% | 1.3 | 1.02 |
| BCZYYb4111 | $PrBa_{0.5}Sr_{0.5}Co_{1.5}Fe_{0.5}O_{5+\delta}$ (PBSCF) | Ni-BCZYYb4111 | 600 | 10% | 1.3 | 0.25 |

TABLE 2-continued

| Proton-Conducting Membrane (Electrolyte) | First Electrode (Steam Side Electrode) | Second Electrode ($H_2$ Side Electrode) | Temp (° C.) | Steam Ratio | Applied Voltage (V) | Current Density (A/cm$^2$) |
|---|---|---|---|---|---|---|
| $BaZr_{0.7}Ce_{0.2}Y_{0.1}O_3$ (BCZY) | $BaGd_{0.8}La_{0.2}Co_2O_{6-\delta}$ | Ni-BCZY | 600 | 50% (1.5 bar) | 1.3 | 0.97 |
| BCZYYb7111 | PBSCF | Ni-BCZYYb7111 | 600 | 12% | 1.3 | 0.55 |
| $BaZr_{0.8}Y_{0.2}O_{3-\delta}$ (BZY) | $La_{0.6}Sr_{0.4}Co_{0.2}Fe_{0.8}O_{3-\delta}$ | Ni-BZY | 600 | 3% | 1.4 | 0.07 |
| $BaCe_{0.5}Zr_{0.3}Y_{0.2}O_{3-\delta}$ (BZCY) | $Sm_{0.5}Sr_{0.5}CoO_{3-\delta}$ | Ni-BZCY | 600 | 50% | 1.4 | 0.65 |
| $BaCe_{0.5}Zr_{0.3}Y_{0.16}Zn_{0.04}O_{3-\delta}$ (BZCYZ) | $La_{0.8}Sr_{0.2}Mn_{1-x}Sc_xO_{3-\delta}$ | $La_{0.75}Sr_{0.25}Cr_{0.5}Mn_{0.5}O_{3-\delta}$ (LSCM) | 700 | 5% | 1.6 | 0.04 |
| LSM-SDC-YSZ | YSZ | Ni-SDC-YSZ | 850 | 50% | 1.4 | 1.4 |
| LSGM | $Ba_{0.6}La_{0.4}CoO_{3-\delta}$ | $Ce_{0.6}Mn_{0.3}Fe_{0.1}O_{2-\delta}$ | 700 | 20% | 1.4 | 0.23 |
| $Ce_{0.9}Gd_{0.1}O_{2-\delta}$ (CGO) | $Pr_2NiO_{4+\delta}$ | Ni-CGO | 700 | 3% | 1.4 | 0.37 |
| YSZ | LSM-YSZ | Ni-YSZ | 700 | 33% | 1.3 | 0.4 |
| $Zr_{0.88}Sc_{0.22}Ce_{0.01}O_{2.11}$ (SSZ) | $Nd_2NiO_{4+\delta}$ | Ni-$Zr_{0.92}Y_{0.16}O_{2.08}$ | 700 | 50% | 1.3 | 0.44 |
| LSGM | PBSCF | $PrBaMnO_{5+\delta}$ | 700 | 10% | 1.3 | 0.5 |

Example 9: Fuel Cell Mode Performance of Electrochemical Cell

Figure 30:
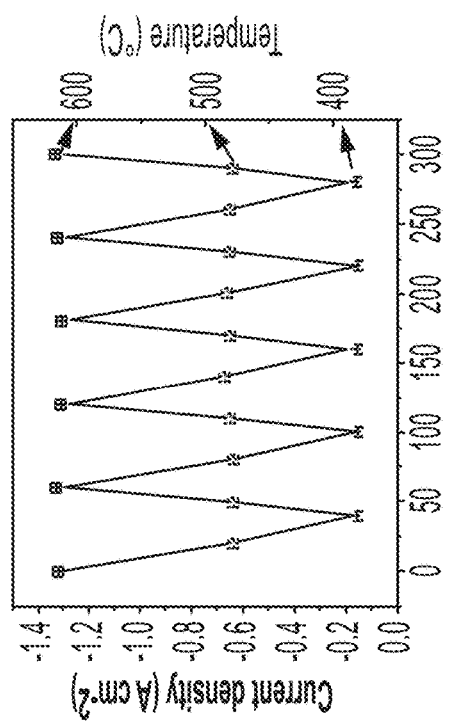
FIG. 30 is a graphical representation of current-voltage-power curves measured at different temperatures within the range of from 500° C. to 600° C. during operation of an electrochemical cell of the disclosure in fuel cell mode, as described in Example 12.
Figure 31:
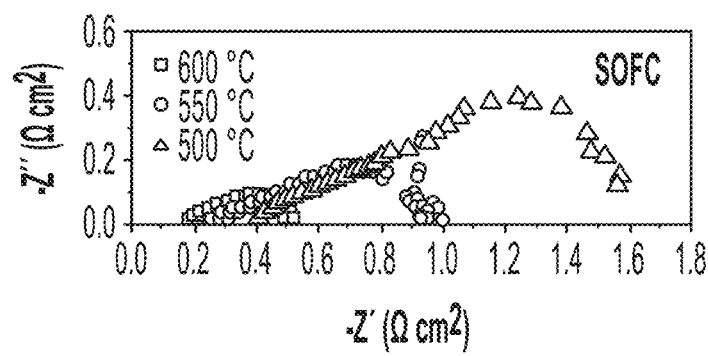
FIG. 31 shows the electrochemical impedance spectra of an electrochemical cell of the disclosure during fuel cell mode operation at different temperatures within the range of from 500° C. to 600° C., as described in Example 12.

An electrochemical cell exhibiting the general configuration of the electrochemical cell 100 shown in FIG. 1, including a first electrode (steam side electrode) comprising $PrNi_{0.5}Co_{0.5}O_{3-\delta}$ (PNC), a proton conducting membrane comprising BCZYYb4411, and a second electrode ($H_2$ gas side electrode) comprising Ni—BCZYYb4411 was subjected to performance analysis during fuel cell mode operation of the electrochemical cell within a temperature range of from about 500° C. to about 600° C. Humid air (10% $H_2O$, 80 mL/min) and 10% $H_2$ gas were respectively fed to the first electrode and the second electrode. FIGS. 30 and 31 are graphical representations of the results of the analysis.

FIG. 30 is a graphical representation of current-voltage-power curves measured at different temperatures within the range of from 500° C. to 600° C. during operation of the electrochemical cell in fuel cell mode. The high open circuit voltages (OCVs) suggest the presence of a dense electrolyte membrane and good sealing (e.g., 1.06 V at 600° C., which is close to the theoretical Nernst potential of 1.13 V). The peak power densities are 528 mW/cm$^2$ at 600° C., 354 mW/cm$^2$ at 550° C., and 230 mW/cm$^2$ at 500° C., respectively, which are among the highest performances of H-SOFCs.

FIG. 31 shows the electrochemical impedance spectra at open circuit conditions and different temperatures within the range of from 500° C. to 600° C. during fuel cell mode operation of the electrochemical cell. When the operating temperature was decreased from 600° C. to 500° C., both Ohmic and electrode polarization resistances increase correspondingly. The activation energy for electrolyte resistance was smaller than that of interfacial electrode polarization.

Example 13: Reversible Operation of Electrochemical Cell

The cycling reversible operation between electrolysis mode and fuel cell mode of an electrochemical cell exhibiting the general configuration of the electrochemical cell 100 shown in FIG. 1, including a first electrode (steam side electrode) comprising $PrNi_{0.5}Co_{0.5}O_{3-\delta}$, a proton conducting membrane comprising BCZYYb4411, and a second electrode ($H_2$ gas side electrode) comprising Ni—BCZYYb4411 was analyzed to determine the capability of converting $H_2$ gas produced during electrolysis mode operation into electricity during fuel cell mode operation.

Figure 32:
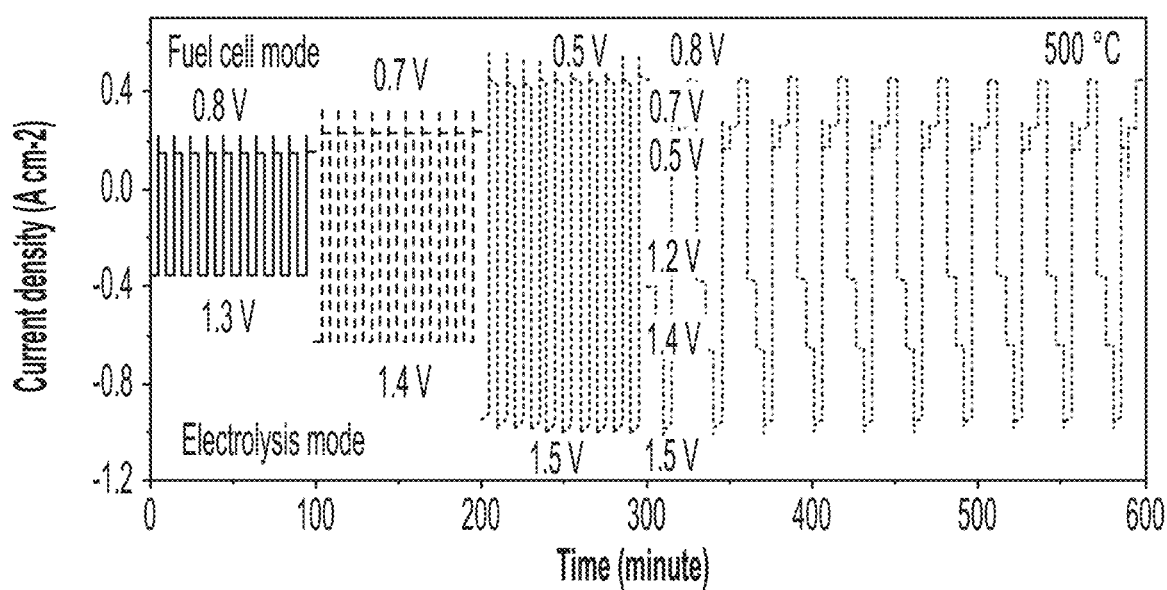
FIG. 32 is a graphical representation of current density changes observed during cycling of an electrochemical cell of the disclosure between electrolysis mode and fuel cell mode at 500° C., as described in Example 13.

First, the electrochemical cell was operated at different voltages at 500° C. to switch working mode between electrolysis mode and fuel cell mode (e.g., 1.3 V, 1.4 V and 1.5 V for producing hydrogen and 0.8 V, 0.7 V, and 0.5 V for generating electricity). FIG. 32 is a graphical representation of the current density changes observed during the cycling of the electrochemical cell. The current densities at each mode are stable with the trend of slight improvement. The continuous hydrogen and power generation at different voltages in ten cycles demonstrates stable operation with resulting current densities. Furthermore, the capability of self-sustainable reversible operation was demonstrated after terminating additional hydrogen supply.

Figure 34:
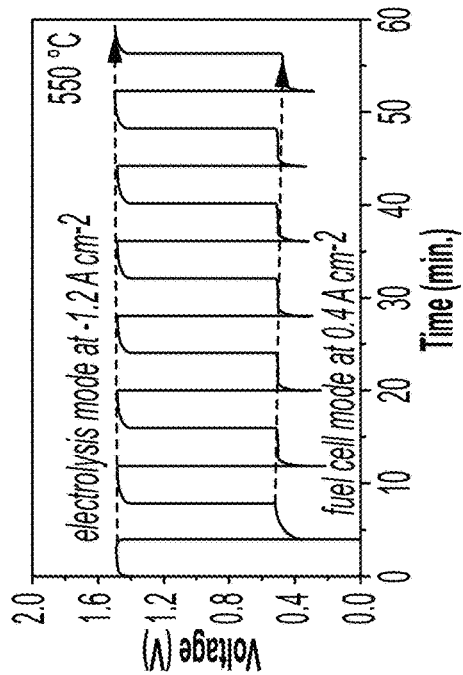
FIGS. 33 and 34 are graphical representations of voltage changes observed during cycling of an electrochemical cell of the disclosure between electrolysis mode and fuel cell mode current densities at 500° C. and 550° C., respectively, as described in Example 13.
Figure 33:
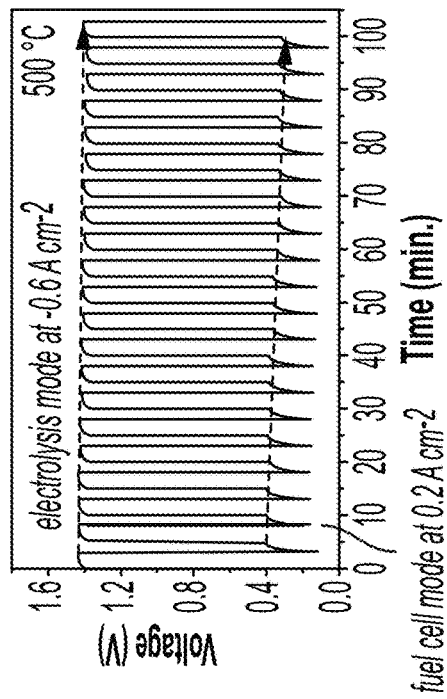

Next, the electrochemical was switched between electrolysis mode operation and fuel cell mode operation at 500° C. and 550° C. and different current densities, starting in fuel cell mode in transiently produced $H_2$ gas. The gas flow at the second electrode was terminated to have only $H_2$ gas produced from electrolysis mode operation as fuel during the fuel cell mode operation while the humid air (3% $H_2O$, 80 mL/min) was fed to the first electrode continuously. At 500° C., the electrochemical cell was first electrolyzed at a constant current density of −0.6 A cm$^{-2}$ for two (2) minutes to generate $H_2$ gas which was then consumed by changing operation to fuel cell mode at 0.2 A cm$^{-2}$ lasting for another two (2) minutes. At 550° C., the electrochemical cell was first electrolyzed at a constant current density of −1.2 A cm$^{-2}$ for two (2) minutes to generate $H_2$ gas which was then consumed by changing operation to fuel cell mode at 0.4 A cm$^{-2}$ lasting for another two (2) minutes. FIGS. 33 and 34 are graphical representations of the voltage changes observed during cycling between the electrolysis mode and fuel cell mode current densities at 500° C. and 550° C., respectively. The cycling between electrolysis mode and fuel cell mode under static gas conditions at the second electrode was successful and showed the ability of the electrochemical cell to effectively achieve the function of a battery (e.g., storing the energy by $H_2$ gas production, and generating electricity by consuming the produced $H_2$ gas as fuel). During the cycling, slight decreases of transient voltage in electrolysis operation was observed and indicated the improvement of electrochemical cell performance, which can be attributed to decreased over-potential caused by the depletion of $H_2$ gas in the previous fuel cell mode step. When the temperature was increased to 550° C., the electrochemical cell showed a similar trend of electrolysis improvement and slight fuel cell mode operation degradation.

Figure 36:
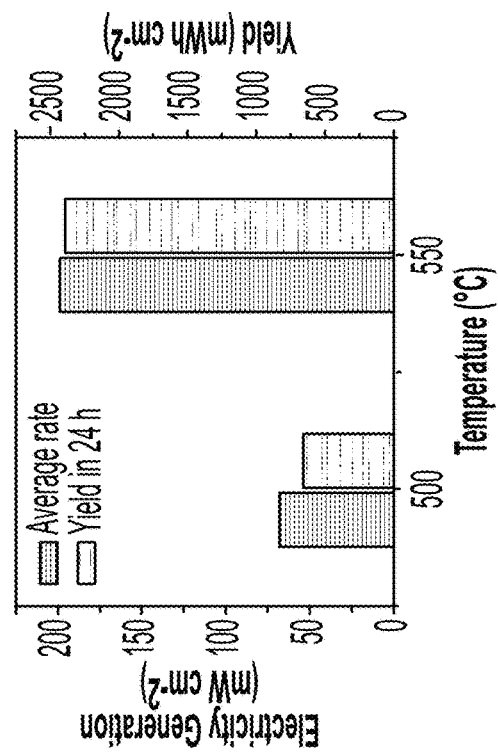
FIG. 36 is a graphical representation showing the results of a daily electricity generation analysis for an electrochemical cell of the disclosure, as described in Example 13.
Figure 35:
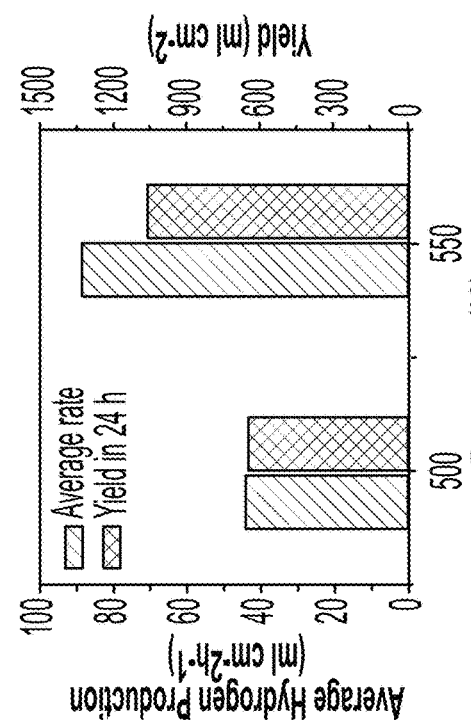
FIG. 35 is a graphical representation showing the results of a daily $H_2$ gas production analysis for an electrochemical cell of the disclosure, as described in Example 13.

In addition, $H_2$ gas production rate and electricity generation yield were calculated from current density, active electrode area, and Faradaic efficiency to determine daily expected outputs in $H_2$ gas and electricity in the electrochemical cell. The average $H_2$ gas production rate was 44.7 ml/cm2/hour at 500° C. and 89.3 ml/cm2/hour at 550° C., respectively, whereas current efficiency is taken into account. The expected daily $H_2$ gas production yield is 643 and 1069 ml/cm2 at 500° C. and 550° C. respectively, based on current electrolysis/fuel cell schedule. FIG. 35 is graphical representation showing the forgoing daily $H_2$ gas production results. When the electrolysis produced $H_2$ gas was used as fuel to convert back to electricity, the electrochemical cell delivered energy with average rate of 70 mWh/cm2 at 500° C. and 200 mWh/cm2 at 550° C. The calculated daily generated electricity was 671 and 2400 mWh/cm2 at 500° C. and 550° C. FIG. 36 shows a graphical representation of the forgoing daily electricity generation results. The results demonstrate the capability of the electrochemical cell to successfully produce $H_2$ gas and then utilize the produced $H_2$ gas to generate electricity.

Example 14: Gas Composition Influence on Electrochemical Cell Performance

The influence of gas composition on the performance of an electrochemical cell exhibiting the general configuration of the electrochemical cell 100 shown in FIG. 1, including a first electrode (steam side electrode) comprising $PrNi_{0.5}Co_{0.5}O_{3-\delta}$ (PNC), a proton conducting membrane comprising BCZYYb4411, and a second electrode ($H_2$ gas side electrode) comprising Ni—BCZYYb4411, during electrolysis mode operation at 500° C. was analyzed.

Figure 37:
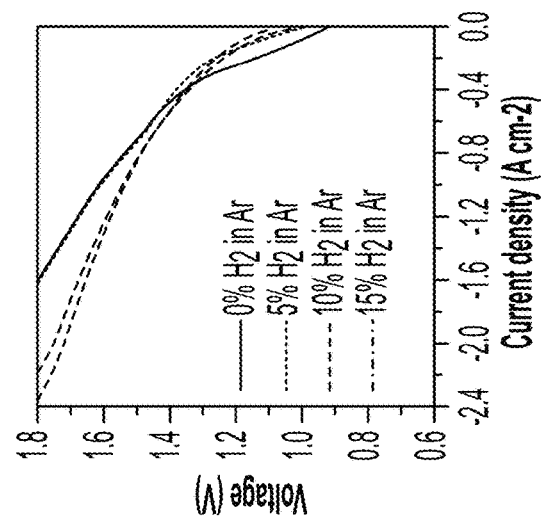
FIG. 37 are 38 are graphical representation of current-voltage curves measured under different gas conditions at a temperature of 500° C. during operation of an electrochemical cell of the disclosure in electrolysis mode, as described in Example 14.

FIG. 37 is a graphical representation of current-voltage curves measured under humid air, oxygen gas, and nitrogen gas conditions at the first electrode of the electrochemical cell and 10% $H_2$ at the second electrode of the electrochemical cell. As shown in FIG. 37, at the first electrode, when humid air was switched to oxygen gas, the electrochemical cell showed higher current density at the same electrolysis voltage.

Figure 38:
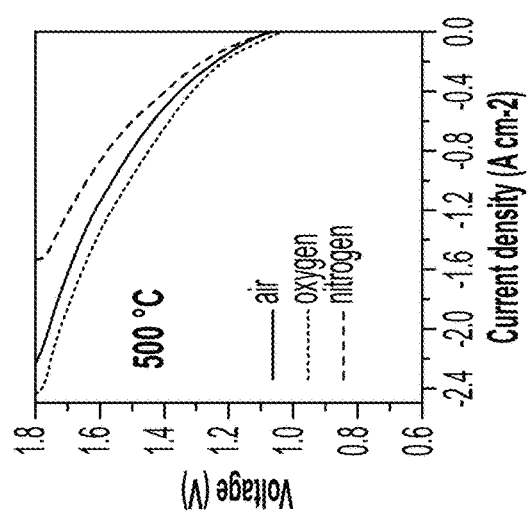

FIG. 38 is a graphical representation of current-voltage curves measured under constant humid air conditions at the first electrode of the electrochemical cell and different hydrogen gas and argon gas conditions at the second electrode of the electrochemical cell. As shown in FIG. 38, at the second electrode, less concentrated hydrogen gas enhanced hydrogen production; and in pure argon gas, the electrochemical cell exhibited the highest current density.

Figure 39:
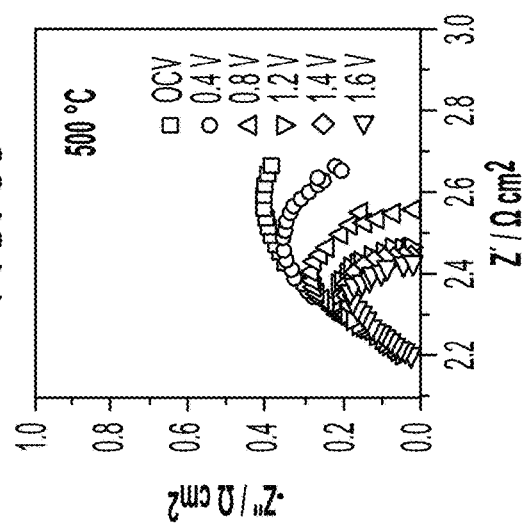
FIGS. 39 and 40 show the electrochemical impedance spectra of an electrochemical cell of the disclosure during electrolysis mode operation at a temperature of 500° C. and different oxygen partial pressures (FIG. 39) and applied voltages (FIG. 40), as described in Example 15.
Figure 40:
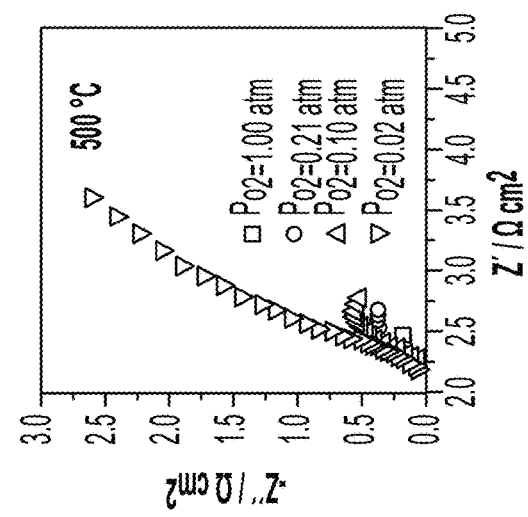

Example 15: Influence of Oxygen Partial Pressure and Applied Voltage on Electrochemical Cell Performance The influence of oxygen partial pressure and applied voltage on the performance of an electrochemical cell exhibiting the general configuration of the electrochemical cell 100 shown in FIG. 1, including a first electrode (steam side electrode) comprising $PrNi_{0.5}Co_{0.5}O_{3-\delta}$ (PNC), a proton conducting membrane comprising BCZYYb4411, and a second electrode ($H_2$ gas side electrode) comprising Ni—BCZYYb4411, during electrolysis mode operation at 500° C. was analyzed. FIGS. 39 and 40 show the electrochemical impedance spectra at different oxygen partial pressures and different applied voltages, respectively. As shown in FIG. 39, higher oxygen partial pressure may improve electrode polarization resistance.

Example 16: Mesh Configuration of $PrNi_{0.5}Co_{0.5}O_{3-\delta}$ Electrode

Figure 41:
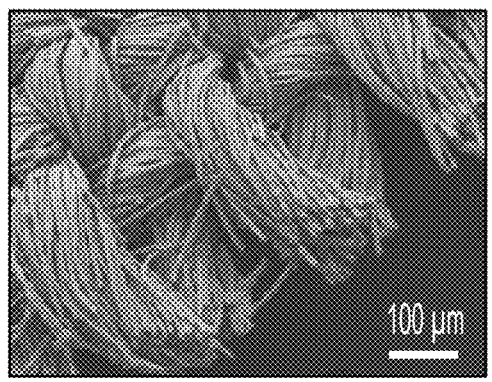
FIGS. 41 and 42 are scanning electron microscopy (SEM) images at different magnifications of an electrode of the disclosure exhibiting a three-dimensional nanofiber-structured mesh of $PrNi_{0.5}Co_{0.5}O_{3-\delta}$, as described in Example 16.
Figure 42:
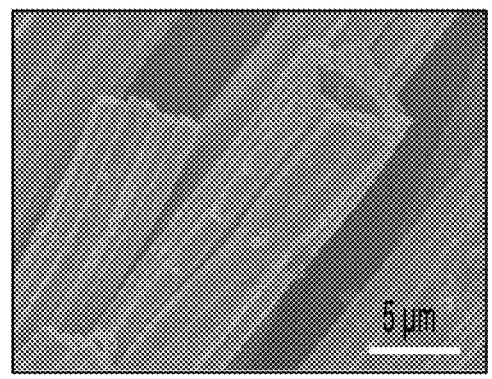
Figure 43:
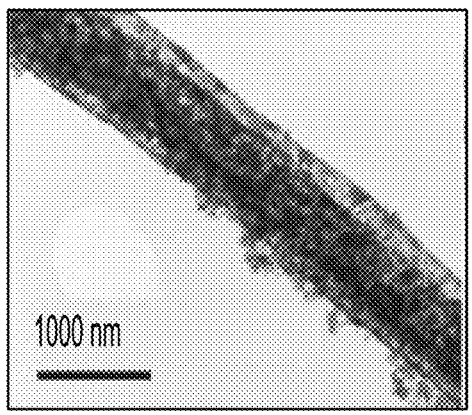
FIGS. 43 and 44 are TEM images at different magnifications of a single $PrNi_{0.5}Co_{0.5}O_{3-\delta}$ nanofiber of the electrode shown in FIGS. 41 and 42, as described in Example 16.
Figure 44:
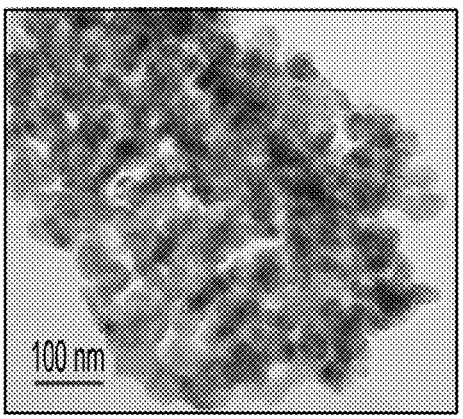

A $PrNi_{0.5}Co_{0.5}O_{3-\delta}$ (PNC) electrode (steam side electrode) was formed to exhibit a three-dimensional nanofiber-structured mesh ("mesh") configuration including interweaved tows of $PrNi_{0.5}Co_{0.5}O_{3-\delta}$ fibers. Each tow of $PrNi_{0.5}Co_{0.5}O_{3-\delta}$ fibers exhibited a through hole having a diameter of about 3 μm extending throughout to length thereof. The through holes facilitated gas diffusion to the nanoparticle-structured surfaces where reactions occur. Each individual $PrNi_{0.5}Co_{0.5}O_{3-\delta}$ fiber was composed of $PrNi_{0.5}Co_{0.5}O_{3-\delta}$ nanoparticles having particle sizes within a range of from about 20 to about 50 nm. FIGS. 41 and 42 show scanning electron microscopy (SEM) images at different magnifications of the $PrNi_{0.5}Co_{0.5}O_{3-\delta}$ electrode. FIGS. 43 and 44 are TEM images at different magnifications of a single (e.g., only one) $PrNi_{0.5}Co_{0.5}O_{3-\delta}$ nanofiber of the $PrNi_{0.5}Co_{0.5}O_{3-\delta}$ electrode.

Example 17: Performance of Electrochemical Cell Including $PrNi_{0.5}Co_{0.5}O_{3-\delta}$ Electrode Having Mesh Configuration An electrochemical cell exhibiting the general configuration of the electrochemical cell 100 shown in FIG. 1, including a $PrNi_{0.5}Co_{0.5}O_{3-\delta}$ (PNC) electrode (a first electrode, a steam side electrode) exhibiting the mesh configuration described in Example 16, a proton conducting membrane comprising BCZYYb4411, and a second electrode ($H_2$ gas side electrode) comprising Ni—BCZYYb4411 was subjected to performance analysis during electrolysis mode operation and fuel cell mode operation within a temperature range of from about 400° C. to about 600° C. Humid air (10% $H_2O$, 80 mL/min) and 10% $H_2$ gas were respectively fed to the $PrNi_{0.5}Co_{0.5}O_{3-\delta}$ electrode and the second electrode.

Figure 45:
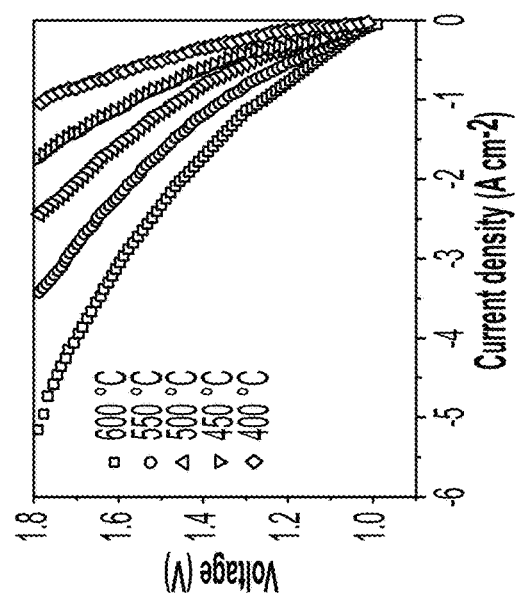
FIG. 45 is a graphical representation of current-voltage curves measured at different temperatures within the range of from 400° C. to 600° C. during electrolysis mode operation of an electrochemical cell of the disclosure including an electrode exhibiting a three-dimensional nanofiber-structured mesh of $PrNi_{0.5}Co_{0.5}O_{3-\delta}$, as described in Example 17.

FIG. 45 is a graphical representation of current-voltage curves measured at different temperatures within a range of from 400° C. to 600° C. during operation of the electrochemical cell in electrolysis mode. The mesh configuration of $PrNi_{0.5}Co_{0.5}O_{3-\delta}$ electrode exhibited excellent electrolysis current density (e.g., 1.18 A/cm² at 1.3 V, and 1.72 A/cm² at 1.4 V).

Figure 46:
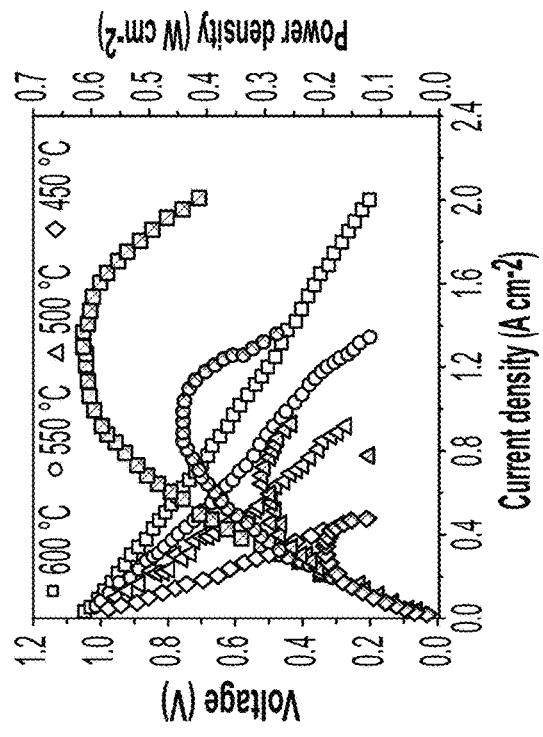
FIG. 46 is a graphical representation of current-voltage-power curves measured at different temperatures within the range of from 450° C. to 600° C. during fuel cell mode operation of an electrochemical cell of the disclosure including an electrode exhibiting a three-dimensional nanofiber-structured mesh of $PrNi_{0.5}Co_{0.5}O_{3-\delta}$, as described in Example 17.

FIG. 46 is a graphical representation of current-voltage-power curves measured at different temperatures within a range of from 450° C. to 600° C. during operation of the electrochemical cell in fuel cell mode. The mesh configuration of $PrNi_{0.5}Co_{0.5}O_{3-\delta}$ electrode exhibited excellent peak power density (e.g., 611 mW/cm² at 600° C.).

Figure 47:
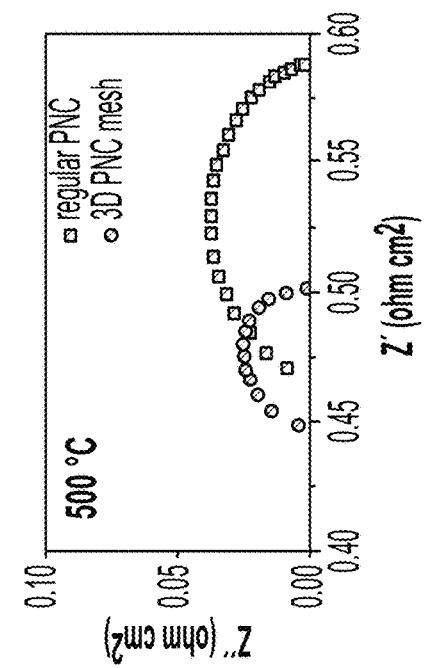
FIG. 47 shows the electrochemical impedance spectra during electrolysis mode operation at 500° C. of different electrochemical cells of the disclosure exhibiting different electrode structural configurations than one another, as described in Example 17.

FIG. 47 shows the electrochemical impedance spectra at 1.4V and 500° C. for an electrochemical cell having a mesh configuration of the $PrNi_{0.5}Co_{0.5}O_{3-\delta}$ electrode thereof relative to an electrochemical cell having a non-mesh configuration of the $PrNi_{0.5}Co_{0.5}O_{3-\delta}$ electrode thereof. As shown in FIG. 47, the electrode polarization resistance (0.055 Ωcm² at 500° C.) of the electrochemical cell having the mesh configuration of the $PrNi_{0.5}Co_{0.5}O_{3-\delta}$ electrode was reduced relative to the electrode polarization resistance (0.13 Ωcm² at 500° C.) having the non-mesh configuration of the $PrNi_{0.5}Co_{0.5}O_{3-\delta}$ electrode.

Figure 48:
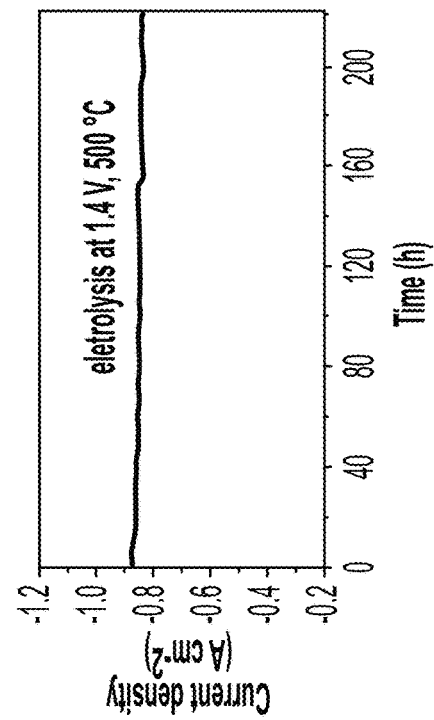
FIG. 48 is a graphical representation showing durability testing results for electrolysis mode operation at 500° C. of an electrochemical cell of the disclosure including an electrode exhibiting a three-dimensional nanofiber-structured mesh of $PrNi_{0.5}Co_{0.5}O_{3-\delta}$, as described in Example 18.

Example 18: Durability of Electrochemical Cell Including $PrNi_{0.5}Co_{0.5}O_{3-\delta}$ Electrode Having Mesh Configuration An electrochemical cell exhibiting the general configuration of the electrochemical cell 100 shown in FIG. 1, including a $PrNi_{0.5}Co_{0.5}O_{3-\delta}$ (PNC) electrode (a first electrode, a steam side electrode) exhibiting the mesh configuration described in Example 16, a proton conducting membrane comprising BCZYYb4411, and a second electrode ($H_2$ gas side electrode) comprising Ni—BCZYYb4411 was subjected to durability analysis during electrolysis mode operation at 500° C. and 1.4V. Humid air (10% $H_2O$, 80 mL/min) and 10% $H_2$ gas were respectively fed to the $PrNi_{0.5}Co_{0.5}O_{3-\delta}$ electrode and the second electrode. FIG. 48 is a graphical representation showing the results of the durability analysis. As shown in FIG. 48, electrolysis current density degradation was not observed over 220 hours.

Example 19: Faradaic Efficiency of Electrochemical Cell

Figure 49:
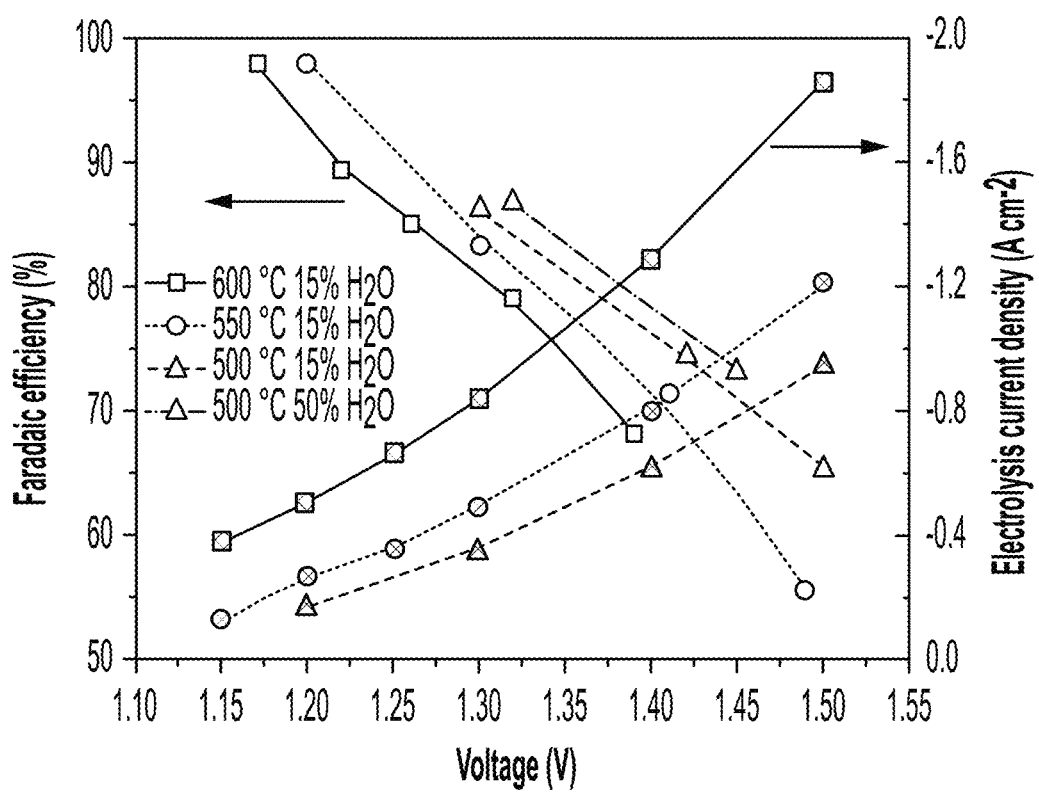
FIG. 49 is a graphical representation of Faradaic efficiency and current density as function of applied electrolysis voltage measured at different temperatures within the range of from 500° C. to 600° C. during electrolysis mode operation of an electrochemical cell of the disclosure, as described in Example 19.

An electrochemical cell exhibiting the general configuration of the electrochemical cell 100 shown in FIG. 1, including a first electrode (a steam side electrode) comprising $PrNi_{0.5}Co_{0.5}O_{3-\delta}$ (PNC), a proton conducting membrane comprising BCZYYb4411, and a second electrode ($H_2$ gas side electrode) comprising Ni—BCZYYb4411 was subjected to Faradaic efficiency analysis during electrolysis mode operation at different temperatures within a range from 500° C. to 600° C. and different air humidities of 15% $H_2O$ and 50% $H_2O$. On the second electrode side dry 5% $H_2$ was employed as feed gas. Gas chromatography was used to monitor the hydrogen concentration change at different constant current densities. The ratio of experimental and theoretical hydrogen production amounts was calculated as the efficiency. FIG. 49 is a graphical representation of the resulting Faradaic efficiency and current density as function of applied electrolysis voltage.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. An electrochemical cell, comprising:
   a first electrode comprising a three-dimensional nanofiber-structured mesh of $Pr(Co_{1-x-y-z}, Ni_x, Mn_y, Fe_z)O_{3-\delta}$, wherein $0 \leq x \leq 0.9$, $0 \leq y \leq 0.9$, $0 \leq z \leq 0.9$, and $\delta$ is an oxygen deficit,
   the three-dimensional nanofiber-structured mesh of $Pr(Co_{1-x-y-z}, Ni_x, Mn_y, Fe_z)O_{3-\delta}$ including multiple tows of nanofibers of the $Pr(Co_{1-x-y-z}, Ni_x, Mn_y, Fe_z)O_{3-\delta}$ interweaved together,
   at least one of the multiple tows of nanofibers of the $Pr(Co_{1-x-y-z}, Ni_x, Mn_y, Fe_z)O_{3-\delta}$ being substantially hollow;
   a second electrode comprising a cermet material including at least one metal and at least one perovskite; and
   a proton-conducting membrane between the first electrode and the second electrode.

2. The electrochemical cell of claim 1, wherein the first electrode comprises $PrNi_{0.5}Co_{0.5}O_{3-\delta}$.

3. The electrochemical cell of claim 1, wherein the first electrode is substantially free of ions of rare-earth elements.

4. The electrochemical cell of claim 1, wherein the second electrode comprises a nickel/perovskite cermet.

5. The electrochemical cell of claim 1, wherein the second electrode comprises a cermet comprising nickel and a yttrium- and ytterbium-doped barium-zirconate-cerate (BZCYYb).

6. The electrochemical cell of claim 1, wherein the proton-conducting membrane comprises one or more of a yttrium- and ytterbium-doped barium-zirconate-cerate (BZCYYb), a yttrium- and ytterbium-doped barium-strontium-niobate (BSNYYb), a doped $BaCeO_3$, a doped $BaZrO_3$, $Ba_2(YSn)O_{5.5}$, and $Ba_3(CaNb_2)O_9$.

7. The electrochemical cell of claim 1, wherein:
   the proton-conducting membrane comprises $BaCe_{0.7}Zr_{0.1}Y_{0.1}Yb_{0.1}O_{3-\delta}$;
   the first electrode comprises $PrNi_{0.5}Co_{0.5}O_{3-\delta}$; and
   the second electrode comprises $Ni—BaCe_{0.7}Zr_{0.1}Y_{0.1}Yb_{0.1}O_{3-\delta}$.

8. The electrochemical cell of claim 1, wherein a through hole extending throughout a length of the at least one of the multiple tows of nanofibers of the $Pr(Co_{1-x-y-z}, Ni_x, Mn_y, Fe_z)O_{3-\delta}$ has a diameter within a range of from about 1 μm to about 5 μm.

9. A system for $H_2$ gas production and electricity generation, comprising:
   a source of steam; and
   an electrochemical apparatus in fluid communication with the source of steam, and comprising:
   a housing structure configured and positioned to receive a steam stream from the source of steam; and
   an electrochemical cell within an internal chamber of the housing structure, and comprising:
   an electrode positioned to interact with the steam stream and comprising a three-dimensional mesh of $Pr(Co_{1-x-y-z}, Ni_x, Mn_y, Fe_z)O_{3-\delta}$,
   wherein $0 \leq x \leq 0.9$, $0 \leq y \leq 0.9$, $0 \leq z \leq 0.9$, and $\delta$ is an oxygen deficit,
   the three-dimensional nanofiber-structured mesh of $Pr(Co_{1-x-y-z}, Ni_x, Mn_y, Fe_z)O_{3-\delta}$ including multiple tows of nanofibers of the $Pr(Co_{1-x-y-z}, Ni_x, Mn_y, Fe_z)O_{3-\delta}$ interweaved together,
   at least one of the multiple tows of nanofibers of the $Pr(Co_{1-x-y-z}, Ni_x, Mn_y, Fe_z)O_{3-\delta}$ being substantially hollow;
   another electrode comprising a metal/perovskite cermet; and
   a proton-conducting membrane between the electrode and the another electrode and comprising a perovskite having an ionic conductivity greater than or equal to about 10'S/cm at one or more temperatures within a range of from about 400° C. to about 600° C.

10. The system of claim 9, wherein the electrochemical cell is configured to switch between an electrolysis mode for producing $H_2$ gas from the steam stream and a fuel cell mode for generating electricity from the produced $H_2$ gas at the one or more temperatures within the range of from about 400° C. to about 600° C.

11. The system of claim 9, wherein:
the electrode comprises $PrNi_{0.5}Co_{0.5}O_{3-\delta}$;
the another electrode comprises $Ni$—$BaCe_{0.7}Zr_{0.1}Y_{0.1}Yb_{0.1}O_{3-\delta}$; and
the proton-conducting membrane comprises $BaCe_{0.7}Zr_{0.1}Y_{0.1}Yb_{0.1}O_{3-\delta}$.

12. A method of generating electricity, comprising:
introducing steam to an electrochemical cell comprising:
a first electrode comprising a three-dimensional nanofiber-structured mesh of $Pr(Co_{1-x-y-z}, Ni_x, Mn_y, Fe_z)O_{3-\delta}$,
wherein $0 \leq x \leq 0.9$, $0 \leq y \leq 0.9$, $0 \leq z \leq 0.9$, and $\delta$ is an oxygen deficit,
the three-dimensional nanofiber-structured mesh of $Pr(Co_{1-x-y-z}, Ni_x, Mn_y, Fe_z)O_{3-\delta}$ including multiple tows of nanofibers of the $Pr(Co_{1-x-y-z}, Ni_x, Mn_y, Fe_z)O_{3-\delta}$ interweaved together,
at least one of the multiple tows of nanofibers of the $Pr(Co_{1-x-y-z}, Ni_x, Mn_y, Fe_z)O_{3-\delta}$ being substantially hollow;
a second electrode comprising a metal/perovskite cermet; and
a proton-conducting membrane between the first electrode and the second electrode;
applying a first potential difference between the first electrode and the second electrode of the electrochemical cell to produce $H_2$ gas from the steam; and
applying a second potential difference between the first electrode and the second electrode of the electrochemical cell to generate electricity using the produced $H_2$ gas as a fuel.

13. The method of claim 12, wherein applying a first potential difference between the first electrode and the second electrode comprises operating the electrochemical cell in electrolysis mode to decompose the steam at the first electrode and produce the $H_2$ gas at the second electrode.

14. The method of claim 12, wherein applying a second potential difference between the first electrode and the second electrode comprises operating the electrochemical cell in fuel cell mode to decompose the produced $H_2$ gas at the second electrode and produce $H_2O$ at the first electrode.

15. The method of claim 12, wherein:
applying a first potential difference between the first electrode and the second electrode comprises applying the first potential difference at a temperature within a range of from about 400° C. to about 600° C.; and
applying a second potential difference between the first electrode and the second electrode comprises applying the first potential difference at the temperature within the range of from about 400° C. to about 600° C.

* * * * *

UNITED STATES PATENT AND TRADEMARK OFFICE
CERTIFICATE OF CORRECTION

| | |
|---|---|
| PATENT NO. | : 11,557,781 B2 |
| APPLICATION NO. | : 16/560719 |
| DATED | : January 17, 2023 |
| INVENTOR(S) | : Dong Ding et al. |

It is certified that error appears in the above-identified patent and that said Letters Patent is hereby corrected as shown below:

In the Specification

Column 4, Line 54, change "FIG. 37 are 38 are" to --FIGS. 37 and 38 are--

In the Claims

Claim 9, Column 28, Line 62, change "about 10'S/cm at" to --about $10^{-2}$ S/cm at--

Signed and Sealed this
Thirteenth Day of August, 2024

Katherine Kelly Vidal
*Director of the United States Patent and Trademark Office*